United States Patent
Gates et al.

(10) Patent No.: US 6,531,997 B1
(45) Date of Patent: *Mar. 11, 2003

(54) METHODS FOR ADDRESSING ELECTROPHORETIC DISPLAYS

(75) Inventors: Holly G Gates, Somerville, MA (US); Barrett Comiskey, Cambridge, MA (US); Peter T. Kazlas, Sudbury, MA (US); Jonathan D. Albert, Cambridge, MA (US); Paul S Drzaic, Lexington, MA (US)

(73) Assignee: E Ink Corporation, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/561,424

(22) Filed: Apr. 28, 2000

Related U.S. Application Data

(63) Continuation-in-part of application No. 09/520,743, filed on Mar. 8, 2000
(60) Provisional application No. 60/131,790, filed on Apr. 30, 1999.

(51) Int. Cl.$^7$ .................................................. G09G 3/34
(52) U.S. Cl. ........................... 345/107; 345/87; 345/95; 345/97; 345/210; 204/606; 315/169.3; 359/296; 349/35
(58) Field of Search ............................. 345/87, 95, 97, 345/107, 210; 204/606; 315/169.3; 359/296–299; 349/35

(56) References Cited

U.S. PATENT DOCUMENTS

| | | | |
|---|---|---|---|
| 3,036,388 A | 5/1962 | Tate .................................. | 35/6 |
| 3,384,488 A | 5/1968 | Tulagin et al. .................. | 96/88 |

(List continued on next page.)

FOREIGN PATENT DOCUMENTS

| | | |
|---|---|---|
| DE | 44 31 441 C1 | 2/1996 |
| DE | 195 00 694 A1 | 8/1996 |

(List continued on next page.)

OTHER PUBLICATIONS

Stephen F. Blazo, "10.1/9:00 A.M.: High Resolution Electrophoretic Display Photoconductor Addressing," SID 82 Digest, pp. 92–93.

Bohnke, et al., "Polymer–Based Solid Electrochemic Cell for Matrix–Addressable Display Devices," Journal of the Electrochemical Society, vol. 138, No. 12, Dec. 1991, pp. 3612–3617.

Chiang, et al., "11.5/4:10 P.M.: A High Speed Electrophoretic Matrix Display," SID 80 Digest, pp. 114–115.

(List continued on next page.)

*Primary Examiner*—Bipin Shalwala
*Assistant Examiner*—Vincent E. Kovalick
(74) *Attorney, Agent, or Firm*—David J. Coie

(57) ABSTRACT

Novel addressing schemes for controlling bistable electronically addressable displays include the use of addressing signals with additional signals having opposite polarity and equal integrated signal strength, and addressing schemes that minimize the number of state changes that a display element undergoes. In one embodiment, pre-pulses are employed to apply a pre-stress to an display element that is equal and opposite to the electrical stress applied in addressing the element. In another embodiment, the addressing signal is followed by a post-stressing pulse. Methods for minimizing the number of display elements that must change state to change the image displayed include the determination of a set of elements that must be deactivated and a set of elements that must be activated to change the image depicted by a display. Alternatively, only the elements forming one image are deactivated before the elements forming a different image are activated.

43 Claims, 14 Drawing Sheets

U.S. PATENT DOCUMENTS

| | | | |
|---|---|---|---|
| 3,612,758 A | 10/1971 | Evans et al. ............. 178/5.4 R |
| 3,670,323 A | 6/1972 | Sobel et al. ............. 340/324 R |
| 3,767,392 A | 10/1973 | Ota ............................. 96/1 R |
| 3,774,196 A * | 11/1973 | Fleming ..................... 315/171 |
| 3,792,308 A | 2/1974 | Ota ............................ 315/150 |
| 3,806,893 A | 4/1974 | Ohnishi et al. ....... 340/173 CH |
| 3,850,627 A | 11/1974 | Wells et al. ................... 96/1.3 |
| 3,972,040 A | 7/1976 | Hilsum et al. ......... 340/324 M |
| 4,041,481 A | 8/1977 | Sato ..................... 340/324 M |
| 4,045,327 A | 8/1977 | Noma et al. ............ 204/299 R |
| 4,068,927 A | 1/1978 | White .................... 350/160 R |
| 4,071,430 A | 1/1978 | Liebert ................... 204/299 R |
| 4,088,395 A | 5/1978 | Giglia ........................ 350/357 |
| 4,123,346 A | 10/1978 | Ploix ....................... 204/299 R |
| 4,149,149 A | 4/1979 | Miki et al. .................. 340/753 |
| 4,203,106 A | 5/1980 | Dalisa et al. ............... 340/787 |
| 4,218,302 A | 8/1980 | Dalisa et al. ........... 204/299 R |
| 4,261,653 A | 4/1981 | Goodrich ................... 350/362 |
| 4,305,807 A | 12/1981 | Somlyody ............... 204/299 R |
| 4,311,361 A | 1/1982 | Somlyody .................. 350/267 |
| 4,324,456 A | 4/1982 | Dalisa ....................... 350/362 |
| 4,390,403 A | 6/1983 | Batchelder ............ 204/180 R |
| 4,418,346 A | 11/1983 | Batchelder ................ 340/787 |
| 4,430,648 A | 2/1984 | Togashi et al. ............. 340/718 |
| 4,439,507 A | 3/1984 | Pan et al. ...................... 430/59 |
| 4,450,440 A | 5/1984 | White ........................ 340/753 |
| 4,522,472 A | 6/1985 | Liebert et al. .............. 350/362 |
| 4,598,960 A | 7/1986 | DiSanto et al. ......... 339/17 M |
| 4,608,558 A * | 8/1986 | Amstutz et al. ............ 345/208 |
| 4,643,528 A | 2/1987 | Bell, Jr. ..................... 350/334 |
| 4,648,956 A | 3/1987 | Marshall et al. ............ 204/299 |
| 4,655,897 A | 4/1987 | DiSanto et al. ......... 204/299 R |
| 4,686,524 A | 8/1987 | White ........................ 340/787 |
| 4,732,830 A | 3/1988 | DiSanto et al. ............... 430/20 |
| 4,741,604 A | 5/1988 | Kornfeld ................... 350/362 |
| 4,742,345 A | 5/1988 | DiSanto et al. ............ 340/787 |
| 4,746,917 A | 5/1988 | DiSanto et al. ............ 340/787 |
| 4,833,464 A | 5/1989 | DiSanto et al. ............ 340/793 |
| 4,846,931 A | 7/1989 | Gmitter et al. ............. 156/633 |
| 4,850,919 A | 7/1989 | Disanto et al. ............... 445/24 |
| 4,883,561 A | 11/1989 | Gmitter et al. ............. 156/633 |
| 4,892,607 A | 1/1990 | DiSanto et al. ......... 156/275.7 |
| 4,931,019 A | 6/1990 | Park .......................... 434/409 |
| 4,947,159 A | 8/1990 | DiSanto et al. ............ 340/787 |
| 5,009,490 A | 4/1991 | Kouno et al. ............... 350/342 |
| 5,028,841 A | 7/1991 | DiSanto et al. ............. 313/505 |
| 5,041,824 A | 8/1991 | DiSanto et al. ............ 340/787 |
| 5,053,763 A | 10/1991 | DiSanto et al. ............ 340/787 |
| 5,066,105 A | 11/1991 | Yoshimoto et al. ........... 359/58 |
| 5,066,946 A | 11/1991 | DiSanto et al. ............ 340/787 |
| 5,070,326 A | 12/1991 | Yoshimoto et al. ......... 340/719 |
| 5,077,157 A | 12/1991 | DiSanto et al. ............... 430/20 |
| 5,105,185 A | 4/1992 | Nakanowatari et al. ..... 340/784 |
| 5,128,226 A | 7/1992 | Hung .......................... 430/58 |
| 5,128,785 A | 7/1992 | Yoshimoto et al. ........... 359/58 |
| 5,161,007 A | 11/1992 | Takanashi et al. ............. 358/43 |
| 5,174,882 A | 12/1992 | DiSanto et al. ......... 204/299 R |
| 5,177,476 A | 1/1993 | DiSanto et al. ............ 340/787 |
| 5,187,609 A | 2/1993 | DiSanto et al. ............ 359/296 |
| 5,194,852 A | 3/1993 | More et al. ................. 340/712 |
| 5,216,416 A | 6/1993 | DiSanto et al. ............ 340/787 |
| 5,220,316 A | 6/1993 | Kazan ....................... 340/784 |
| 5,223,115 A | 6/1993 | DiSanto et al. ......... 204/299 R |
| 5,223,823 A | 6/1993 | DiSanto et al. ............ 340/787 |
| 5,247,290 A | 9/1993 | DiSanto et al. ............ 345/107 |
| 5,250,932 A | 10/1993 | Yoshimoto et al. ......... 345/206 |
| 5,250,938 A | 10/1993 | DiSanto et al. ............ 345/107 |
| 5,254,981 A | 10/1993 | DiSanto et al. ............ 345/107 |
| 5,266,937 A | 11/1993 | DiSanto et al. ............ 345/107 |
| 5,270,843 A | 12/1993 | Wang .......................... 359/52 |
| 5,276,438 A | 1/1994 | DiSanto et al. ............. 345/107 |
| 5,279,694 A | 1/1994 | DiSanto et al. .......... 156/275.5 |
| 5,293,528 A | 3/1994 | DiSanto et al. ............. 345/107 |
| 5,296,974 A | 3/1994 | Tada et al. .................. 359/885 |
| 5,302,235 A | 4/1994 | DiSanto et al. ............. 156/643 |
| 5,303,073 A | 4/1994 | Shirota et al. ................ 359/51 |
| 5,304,439 A | 4/1994 | DiSanto et al. ............... 430/20 |
| 5,315,312 A | 5/1994 | DiSanto et al. ............. 345/107 |
| 5,345,251 A | 9/1994 | DiSanto et al. ............. 345/107 |
| 5,359,346 A | 10/1994 | DiSanto et al. ............. 345/107 |
| 5,362,671 A | 11/1994 | Zavracky et al. ............. 437/81 |
| 5,383,008 A | 1/1995 | Sheridon .................... 355/256 |
| 5,389,945 A | 2/1995 | Sheridon ...................... 345/85 |
| 5,042,145 A | 3/1995 | DiSanto et al. ............. 345/107 |
| 5,412,398 A | 5/1995 | DiSanto et al. ............. 345/107 |
| 5,460,688 A | 10/1995 | DiSanto et al. ................. 216/5 |
| 5,463,492 A | 10/1995 | Check, III ................... 359/296 |
| 5,467,107 A | 11/1995 | DiSanto et al. ............. 345/107 |
| 5,499,038 A | 3/1996 | DiSanto et al. ............. 345/107 |
| 5,508,720 A | 4/1996 | DiSanto et al. ............. 345/169 |
| 5,545,291 A | 8/1996 | Smith et al. .............. 156/655.1 |
| 5,561,443 A | 10/1996 | DiSanto et al. ............. 345/107 |
| 5,565,885 A | 10/1996 | Tamanoi .................... 345/100 |
| 5,573,711 A | 11/1996 | Hou et al. ................... 252/572 |
| 5,575,554 A | 11/1996 | Guritz ........................ 362/103 |
| 5,583,675 A | 12/1996 | Yamada et al. ............... 349/84 |
| 5,602,572 A | 2/1997 | Rylander ...................... 347/15 |
| 5,609,978 A | 3/1997 | Giorgianni et al. ............ 430/30 |
| 5,614,340 A | 3/1997 | Bugner et al. ................. 430/41 |
| 5,623,585 A | 4/1997 | Matias et al. ................ 395/115 |
| 5,625,460 A | 4/1997 | Tai ............................. 358/298 |
| 5,627,561 A | 5/1997 | Laspina et al. .............. 345/107 |
| 5,638,103 A | 6/1997 | Obata et al. ................. 347/164 |
| 5,648,801 A | 7/1997 | Beardsley et al. ............. 347/15 |
| 5,650,199 A | 7/1997 | Chang et al. .................. 427/33 |
| 5,650,247 A | 7/1997 | Taniguchi et al. .............. 430/1 |
| 5,650,872 A | 7/1997 | Saxe et al. .................. 359/296 |
| 5,675,719 A | 10/1997 | Matias et al. ................ 395/115 |
| 5,684,501 A | 11/1997 | Knapp et al. .................. 345/94 |
| 5,686,383 A | 11/1997 | Long et al. .................. 503/227 |
| 5,688,584 A | 11/1997 | Casson et al. ............... 428/209 |
| 5,689,282 A | 11/1997 | Wolfs et al. ................. 345/100 |
| 5,699,102 A | 12/1997 | Ng et al. ..................... 347/224 |
| 5,707,738 A | 1/1998 | Hou ........................... 428/402 |
| 5,714,051 A | 2/1998 | Van Leth et al. ............ 305/122 |
| 5,715,511 A | 2/1998 | Aslam et al. ................ 399/320 |
| 5,715,514 A | 2/1998 | Williams et al. ............ 399/395 |
| 5,717,515 A | 2/1998 | Sheridon .................... 359/296 |
| 5,718,996 A | 2/1998 | Iijima et al. .................. 430/56 |
| 5,721,042 A | 2/1998 | Iijima et al. ................. 428/195 |
| 5,725,935 A | 3/1998 | Rajan ......................... 428/195 |
| 5,729,663 A | 3/1998 | Lin et al. .................... 395/109 |
| 5,731,116 A | 3/1998 | Matsuo et al. ................. 430/56 |
| 5,737,115 A | 4/1998 | Mackinlay et al. .......... 359/296 |
| 5,738,977 A | 4/1998 | Van Der Sluis-Van Der Voort et al. .......................... 430/313 |
| 5,739,801 A | 4/1998 | Sheridon ...................... 345/84 |
| 5,740,495 A | 4/1998 | Maher et al. .................. 339/71 |
| 5,744,283 A | 4/1998 | Spierings et al. ............ 430/313 |
| 5,750,238 A | 5/1998 | Iijima et al. ................. 428/195 |
| 5,783,856 A | 7/1998 | Smith et al. ................. 257/618 |
| 5,786,875 A | 7/1998 | Brader et al. .................. 349/20 |
| 5,824,186 A | 10/1998 | Smith et al. .............. 156/655.1 |
| 5,892,504 A | 4/1999 | Knapp ........................ 345/204 |
| 5,904,545 A | 5/1999 | Smith et al. ................. 438/455 |
| 5,930,026 A | 7/1999 | Jacobson et al. ............ 359/296 |
| 5,933,203 A * | 8/1999 | Wu et la. .................... 345/209 |
| 5,936,259 A | 8/1999 | Katz et al. .................... 257/40 |
| 5,961,804 A | 10/1999 | Jacobson et al. ............ 204/606 |
| 5,969,376 A | 10/1999 | Bao ............................. 257/40 |
| 6,005,791 A | 12/1999 | Gudesen et al. ............. 365/114 |

| | | | | | | |
|---|---|---|---|---|---|---|
| 6,005,817 A | 12/1999 | Gudesen et al. ............ 365/215 | | JP | 10149118 | 6/1998 |
| 6,045,955 A | 4/2000 | Vincent ........................ 430/45 | | JP | 10161161 | 6/1998 |
| 6,055,180 A | 4/2000 | Gudesen et al. ............ 365/175 | | JP | 11202804 A | 7/1999 |
| 6,154,190 A * | 11/2000 | Yang et al. .................... 345/94 | | JP | 11212499 A | 8/1999 |
| 6,204,908 B1 * | 3/2001 | Hashimoto et al. ......... 349/112 | | JP | 11219135 A | 8/1999 |
| 6,300,932 B1 * | 10/2001 | Albert ........................ 204/606 | | JP | 11264812 A | 9/1999 |
| 6,348,908 B1 * | 2/2002 | Richley et al. ............. 250/215 | | WO | 92/12453 | 7/1992 |
| 6,426,802 B1 * | 7/2002 | Lin ............................ 358/1.9 | | WO | 92/17873 | 10/1992 |
| | | | | WO | 92/20060 | 12/1992 |
| | FOREIGN PATENT DOCUMENTS | | | WO | 92/21733 | 12/1992 |
| | | | | WO | 93/02443 | 2/1993 |
| EP | 0 186 710 A1 | 7/1986 | | WO | 93/04458 | 3/1993 |
| EP | 0 325 013 B1 | 7/1989 | | WO | 93/04459 | 3/1993 |
| EP | 0 325 013 A1 | 7/1989 | | WO | 93/05425 | 3/1993 |
| EP | 0 344 367 A1 | 12/1989 | | WO | 93/07608 | 4/1993 |
| EP | 0 344 367 B1 | 12/1989 | | WO | 93/17414 | 9/1993 |
| EP | 0 361 420 A2 | 4/1990 | | WO | 93/18428 | 9/1993 |
| EP | 0 362 928 A1 | 4/1990 | | WO | 94/19789 | 9/1994 |
| EP | 0 363 030 A2 | 4/1990 | | WO | 95/05622 | 2/1995 |
| EP | 0 363 030 B1 | 4/1990 | | WO | 95/06307 | 3/1995 |
| EP | 0 396 247 B1 | 11/1990 | | WO | 95/07527 | 3/1995 |
| EP | 0 396 247 A2 | 11/1990 | | WO | 95/10107 | 4/1995 |
| EP | 0 404 545 A2 | 12/1990 | | WO | 95/22085 | 8/1995 |
| EP | 0 443 571 A2 | 8/1991 | | WO | 96/41372 | 12/1996 |
| EP | 0 448 853 A1 | 10/1991 | | WO | 97/01166 | 1/1997 |
| EP | 0 448 853 B1 | 10/1991 | | WO | 97/01171 | 1/1997 |
| EP | 0 460 747 A2 | 12/1991 | | WO | 97/04398 | 2/1997 |
| EP | 0 525 852 A1 | 2/1993 | | WO | 97/24907 | 7/1997 |
| EP | 0 525 852 B1 | 3/1993 | | WO | 97/01165 | 9/1997 |
| EP | 0 570 995 A1 | 11/1993 | | WO | 97/35298 | 9/1997 |
| EP | 0 570 995 B1 | 11/1993 | | WO | 97/48009 | 12/1997 |
| EP | 0 575 475 B1 | 12/1993 | | WO | 97/49125 | 12/1997 |
| EP | 0 586 545 B1 | 3/1994 | | WO | 98/03896 | 1/1998 |
| EP | 0 856 373 B1 | 3/1994 | | WO | 98/19208 | 5/1998 |
| EP | 0 595 812 B1 | 5/1994 | | WO | 98/41898 | 9/1998 |
| EP | 0 601 072 B1 | 6/1994 | | WO | 98/55897 | 12/1998 |
| EP | 0 601 075 B1 | 6/1994 | | WO | 98/58383 | 12/1998 |
| EP | 0 604 423 B1 | 6/1994 | | WO | 99/10768 | 3/1999 |
| EP | 0 618 715 A1 | 10/1994 | | WO | 99/12170 | 3/1999 |
| EP | 0 684 579 A2 | 11/1995 | | WO | 99/20682 | 4/1999 |
| EP | 0 685 101 B1 | 12/1995 | | WO | 99/26419 | 5/1999 |
| EP | 0 709 713 A2 | 5/1996 | | WO | 99/40631 | 8/1999 |
| EP | 0 924 551 A1 | 6/1999 | | WO | 99/41732 | 8/1999 |
| EP | 0 962 808 A2 | 12/1999 | | WO | 99/41787 | 8/1999 |
| EP | 1 024 540 A2 | 8/2000 | | WO | 99/41788 | 8/1999 |
| FR | 2 693 005 | 12/1993 | | WO | 99/44229 | 9/1999 |
| GB | 1 314 906 | 4/1973 | | WO | 99/45416 | 9/1999 |
| GB | 2 149 548 A | 6/1985 | | WO | 99/45582 | 9/1999 |
| GB | 2 306 229 A | 4/1997 | | WO | 99/47970 | 9/1999 |
| GB | 3 324 273 A | 10/1998 | | WO | 99/53371 | 10/1999 |
| JP | 54111368 | 8/1979 | | WO | 99/56171 | 11/1999 |
| JP | 55096922 | 7/1980 | | WO | 99/63527 | 12/1999 |
| JP | 62058222 | 2/1987 | | WO | 99/65011 | 12/1999 |
| JP | 62231930 | 10/1987 | | WO | 99/65012 | 12/1999 |
| JP | 01086116 | 3/1989 | | | | |
| JP | 6486116 | 3/1989 | | | OTHER PUBLICATIONS | |
| JP | 3-91772 | 4/1991 | | | | |
| JP | 3-96925 | 4/1991 | | | | |
| JP | 03091722 | 4/1991 | | | | |
| JP | 03096925 | 4/1991 | | | | |
| JP | 03053114 | 7/1991 | | | | |
| JP | 3053224 | 7/1991 | | | | |
| JP | 5-61421 | 3/1993 | | | | |
| JP | 6089081 | 3/1994 | | | | |
| JP | 6-202168 | 7/1994 | | | | |
| JP | 07036020 | 2/1995 | | | | |
| JP | 9031453 A | 2/1997 | | | | |
| JP | 9-185087 | 7/1997 | | | | |
| JP | 09230391 | 9/1997 | | | | |
| JP | 9-6277 | 10/1997 | | | | |
| JP | 1048673 | 2/1998 | | | | |
| JP | 10072571 A | 3/1998 | | | | |

Andrew L. Dalisa, "Electrophoretic Display Technology," IEEE Electron Devices Society, vol. Ed–24, No. 7, Jul. 1977, pp. 827–834.

Hosaka et al., "Electromagnetic microrelays: concepts and fundamentals characteristics," Sensors and Actuators A, vol. A40, No. 1, Jan. 1994, pp. 41–48.

Cary Kornfeld, "9.5: A Defect–Tolerant Active–Matrix Electrophoretic Display," SID 84 Digest, pp. 142–144.

Moesner, et al., "Devices for Particle Handling by an AC Electric Field," 1995 IEEE, pp. 66–69.

P. Murau, "9.4: Characteristics of an X–Y Addressed Electrophoretic Image Display (EPID)," SID 84 Digest, p. 141.

Vaz et al., "Dual frequency addressing of polymer–dispersed liquid–crystal films," Journal of Applied Physics, vol. 65, No. 12, Jun. 15, 1989, pp. 5043–5050.

Ota, et al., "Developments in Electrophoretic Displays," Proceeding of the S.I.D., vol. 18/3 & 4, 1977, pp. 243–253.

Ota, et al., "Electrophoretic display devices," Laser 75 Optoelectronics Conference Proceedings, pp. 145–148.

Ota et al., "Electrophoretic Image Display (EPID) Panel," 1973, pp. 832–836.

Jacques Pankove, "Color Reflection Type Display Panel," RCA Technical Notes, No. 535, Mar. 1962, pp. 1–2.

W. Stephen Quon, "Multilevel Voltage Select (MLVS): A Novel Technique to X–Y Address and Electrophoretic Image Display," 1977.

Saitoh, et al., "A Newly Developed Electrical Twisting Ball Display," Proceedings of the SID, vol. 23/4, 1982, pp. 249–253.

Sheridon, et al., "10.2/9:25 A.M.: A Photoconductor–Addressed Electrophoretic Cell for Office Data Display," SID 82 Digest, pp. 94–95.

Shiffman, et al., "An Electrophoretic Image Display with Internal NMOS Address Logic and Display Drivers," Proceedings of the SID, vol. 25/2, 1984, pp. 105–115.

Shiwa, et al., "5.6: Electrophoretic Display Method Using Ionographic Technology," SID 88 Digest, pp. 61–62.

Singer, et al., "An X–Y Addressable Electrophoretic Display," Proceedings of the S.I.D., vol. 18/3 & 4, 1977, pp. 255–266.

Dennis W. Vance, "Optical Characteristics of Electrophoretic Displays," Proceedings of the S.I.D., vol. 18/3 & 4, 1977 pp. 267–274.

Yamaguchi, et al., "Equivalent Circuit of Ion Projection–Driven Electrophoretic Display," IFICE Transactions, vol. E 74 No. 12, Dec. 1991, pp. 4152–4156.

Comiskey, et al., "An electrophoretic ink for all–printed reflective electronic displays," Nature, vol. 394, Jul. 16, 1998, pp. 253–255.

Hopper, et al., "An Electrophoretic Display, Its Properties, Model and Addressing," IEEE Transactions on Electron Devices, vol. ED–26, No. 8, Aug. 1979, pp. 1148–1152.

R. White, "An Electrophoretic Bar Graph Display," Proceedings of the S.I.D., vol. 22/3, 1981, pp. 173–180.

M. Anita, "Switchable Reflections Make Electronic Ink," Science, vol. 285, Jul. 30, 1999, p. 658.

Chiang, et al., "7.5/4:05 P.M.: A Stylus Writable Electrophoretic Display Device," SID 79 Digest, pp. 44–45.

Nakamura et al., "37.3: Development of Electrophoretic Display Using Microcapsulated Suspension," 1998 SID.

Dabbousi et al., "Electroluminescence from CdSe quantum–dot/polymer composites," 1995 American Institute of Physics, pp. 1316–1318.

Huang et al., "Photoluminescene and electroluminescene of ZnS:Cu nanocrystals in polymeric networks," 1997 American Institute of Physics, pp. 2335–2337.

Drzaic et al., "44.3L: A Printed and Rollable Bistable Electronic Display," 1998 SID.

* cited by examiner

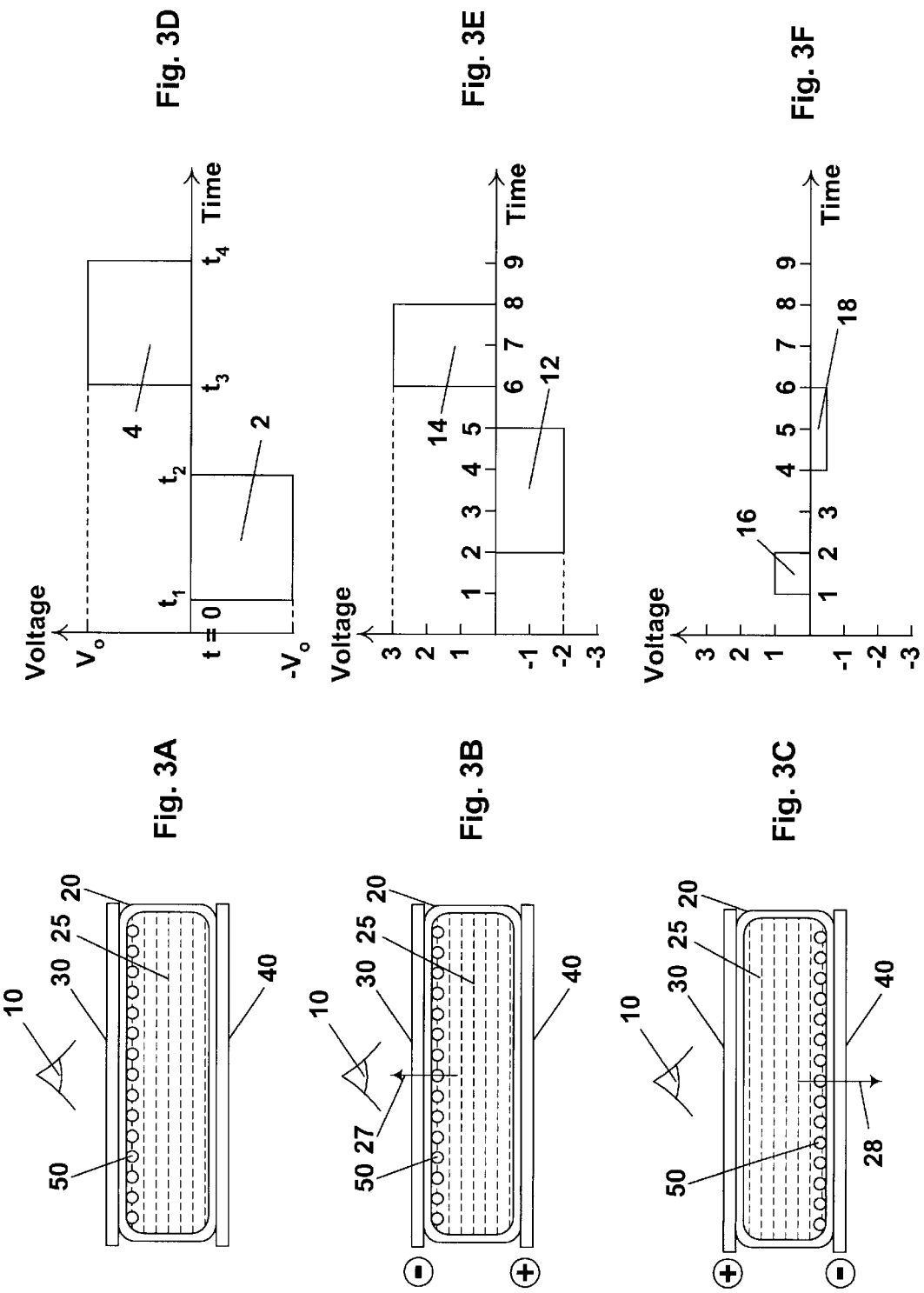

METHODS FOR ADDRESSING ELECTROPHORETIC DISPLAYS

REFERENCE TO RELATED APPLICATION

This application is a continuation-in-part of application Ser. No. 09/520,743, filed Mar. 8, 2000 by the present inventors. This application also claims priority from Provisional Application Serial No. 60/131,790, filed Apr. 30, 1999.

FIELD OF THE INVENTION

The present invention relates to electronic displays and, in particular, to reducing the rate of deterioration of display material in such displays.

BACKGROUND OF THE INVENTION

Traditionally, electronic displays such as liquid crystal displays have been made by sandwiching an optoelectrically active material between two pieces of glass. In many cases each piece of glass has an etched, clear electrode structure formed using indium tin oxide. A first electrode structure controls all the segments of the display that may be addressed, that is, changed from one visual state to another. A second electrode, sometimes called a counter electrode, addresses all display segments as one large electrode, and is generally designed not to overlap any of the rear electrode wire connections that are not desired in the final image. Alternatively, the second electrode is also patterned to control specific segments of the displays.

Conventional liquid crystal displays are monostable, i.e., in the absence of any potential difference between the electrodes, the liquid crystal molecules assume random orientations, which renders the liquid crystal material non-transmissive of light, and indeed in such displays a given pixel is rendered non-transmissive simply by removing the potential difference between its associated electrode and the counter electrode, thereby allowing the molecules within this pixel to relax to random orientations. To maintain any given pixel in a transmissive state, it is necessary to drive the associated electrode substantially continuously.

Electrophoretic and other bistable displays have been the subject of intense research and development for a number of years. (The term "bistable" is used herein in its conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. The bistable characteristics of such displays are discussed in more detail below.) Such displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to cluster and settle, resulting in inadequate service-life for these displays.

An encapsulated, electrophoretic display typically does not suffer from the clustering and settling failure mode of traditional electrophoretic devices and provides further advantages, such as the ability to print or coat the display on a wide variety of flexible and rigid substrates.

In electrophoretic and other bistable displays, it has been commonly observed that the display fails after some time. One of the reasons why such a display may fail is that the materials used to construct the display are damaged by repeated application of electrical addressing signals. In particular, the application of a signal of one volt over a distance of one micron (one micrometer), or ten microns results in field strengths applied to the capsule of one million volts per meter or one hundred thousand volts per meter, respectively. These are quite large field strengths.

SUMMARY OF THE INVENTION

The present invention provides a solution that overcomes these and other problems that are encountered in conventional addressing methods that have been used in the prior art to address bistable displays. This invention provides novel methods and apparatus for controlling and addressing such displays. Additionally, the invention discloses applications of these methods and materials on flexible substrates, which are useful in large-area, low cost, or high-durability applications.

In one aspect, the present invention relates to a first method for addressing a bistable display element having first and second display states differing in at least one optical property. The method comprises (a) applying a first addressing signal to the display element that does not substantially change the display state of the display element; and (b) applying a second addressing signal to the display element that does change the display state of the display element.

In another aspect, the present invention relates to a second method for addressing a bistable display element having first and second display states differing in at least one optical property. The method comprises (a) applying to the display element a first addressing signal effective to change the display state of the display element; and (b) thereafter applying to the display element a second addressing signal that does not change the display state of the display element.

Embodiments of both these methods may have the following features. The display element can be an electrophoretic element, desirably an encapsulated electrophoretic display element. The electrophoretic display element may comprise an electrophoretic medium comprising a liquid and at least one particle disposed within this liquid and capable of moving therethrough on application of an electric field to the medium. Such an element may have a viewing surface and the liquid can have an optical property differing from that of the particle disposed therein so that the display element is in its first display state when the particle(s) lie(s) adjacent the viewing surface and in its second display state when the particle(s) is/are spaced from the viewing surface so that the liquid lies adjacent the viewing surface. Alternatively, the element may have a viewing surface and the liquid can have disposed therein at least one first particle having a first optical property and a first electrophoretic mobility and at least one second particle having a second optical property different from the first optical property and a second electrophoretic mobility different from the first electrophoretic mobility, so that the display element is in its first display state when the first particle(s) lie(s) adjacent the viewing surface and is in its second display state when the second particle(s) lie(s) adjacent the viewing surface.

The first method of the invention can include the step of applying to the display element a first addressing signal having a first polarity, a first amplitude as a function of time, and a first duration, such that the first addressing signal does not substantially change the optical property displayed by the display element. The first method can also include the step of applying to the display element a second addressing signal having a second polarity opposite the first polarity, a second amplitude as a function of time, and a second duration such that the second addressing signal substantially changes the optical property displayed by the display element.

The second method of the invention differs from the first in that, in the second method, the addressing signal which changes the state of the display element is applied first, and thereafter there is applied the addressing signal which does not change the state of the display element. While at first it might appear difficult if not impossible to apply a substantial second addressing signal which does not change the state of the display brought about by the first addressing signal, in practice bistable displays, especially electrophoretic bistable displays, typically exhibit a "threshold" signal level, i.e., it is possible to apply a small signal to a display element without changing the display state of the element, even though a larger signal of the same polarity applied to the display element would bring about a rapid change of display state. Thus, the second method of the invention is conveniently practiced by making the first addressing signal of brief duration and large amplitude, while the second addressing signal is of lengthy duration but small amplitude. Typically, the second addressing signal has amplitude not greater than about one-fifth of the amplitude of the first addressing signal and a duration at least about five times the duration of the first addressing signal; preferably, the second addressing signal has an amplitude not greater than about one-tenth of the amplitude of the first addressing signal and a duration at least about ten times the duration of the first addressing signal.

In both the first and second methods of the present invention, desirably the sum of the first amplitude as a function of time integrated over the first duration and the second amplitude as a function of time integrated over the second duration is substantially zero, i.e., the algebraic sum of the integral of the first addressing signal with respect to time and the integral of the second addressing signal with respect to time is substantially zero. In a preferred embodiment, this algebraic sum is smaller in absolute magnitude than 10 Volt-seconds; in a more preferred embodiment, smaller in absolute magnitude than 1 Volt-second; and in a still more preferred embodiment, smaller in absolute magnitude than 0.1 Volt-seconds. The aforementioned sum (expressed in volt-seconds) is, in a preferred embodiment, smaller in absolute magnitude than one-tenth of the maximum amplitude expressed in volts of the larger of the first and second amplitudes; in a more preferred embodiment, this sum is smaller in absolute magnitude than one one-hundredth of this maximum amplitude; and in a still more preferred embodiment, this sum is smaller in absolute magnitude than one one-thousandth of this maximum amplitude.

The methods can include using first and second addressing signals of opposite polarity.

The methods can include steps of applying first and second addressing pulses such that the second amplitude differs from the first amplitude, or the second duration differs from the first duration. The methods can include steps of applying first and second addressing pulses such that the sum of the product of the first amplitude and the first duration and the product of the second amplitude and the second duration is substantially zero. The methods can also include using first and/or second addressing signals comprising a plurality of addressing pulses. The methods can include the step waiting for a predetermined period of time after step (a) and before step (b).

In another aspect, the present invention relates to a third method for addressing a bistable display, this display comprising a set of display elements each having first and second display states differing in at least one optical property. The method comprises: (a) selecting a first subset of display elements that represent a first image to be displayed, and applying to this first subset a first addressing signal, thereby causing first subset to assume their first display state and the electrophoretic display to display the first image; and (b) selecting a second subset of display elements that represent a second image to be displayed, thereby defining three classes of display elements, namely a first class which are members of both the first and second subsets, a second class which are members of the first subset but not members of the second subset, and a third class which are not members of the first subset but are members of the second subset, and applying to the second class a second addressing signal, thereby setting said second class to their second display state, and applying to the third class a third addressing signal, thereby setting said third class to their first display state and causing the display to display the second image.

In another aspect, the present invention relates to a fourth method for addressing a bistable display, this display comprising a set of display elements each having first and second display states differing in at least one optical property. The method comprises (a) causing the display to display a first image in which a first subset of display elements are in their first display state and the complement of the first subset of display elements are in their second display state; (b) applying to the first subset of display elements, but not to the complement of the first subset, a first addressing signal, thereby causing the first subset to assume their second display state; and (c) applying to a second subset of display elements, different from said first subset, but not to the complement of the second subset, a second addressing signal, thereby causing the second subset to assume their first display state and the display to display a second image, different from the first image, the second image being formed by the second subset of display elements being in their first display state and the complement of the second subset being in their second display state.

Embodiments of both these methods may have the following features. The display element can be an electrophoretic element, desirably an encapsulated electrophoretic display element. The electrophoretic display element may comprise an electrophoretic medium comprising a liquid and at least one particle disposed within this liquid and capable of moving therethrough on application of an electric field to the medium. Such an element may have a viewing surface and the liquid can have an optical property differing from that of the particle disposed therein so that the display element is in its first display state when the particle(s) lie(s) adjacent the viewing surface and in its second display state when the particle(s) is/are spaced from the viewing surface so that the liquid lies adjacent the viewing surface. Alternatively, the element may have a viewing surface and the liquid can have disposed therein at least one first particle having a first optical property and a first electrophoretic mobility and at least one second particle having a second optical property different from the first optical property and a second electrophoretic mobility different from the first electrophoretic mobility, so that the display element is in its first display state when the first particle(s) lie(s) adjacent the viewing surface and is in its second display state when the second particle(s) lie(s) adjacent the viewing surface.

The methods can include, before step (a), the step of applying to all the display elements of the set a blanking signal sufficient to cause every display element of the display to display its second display state. The method may further comprise the step of applying to all the display elements, prior to the application of the blanking signal thereto, a pre-blanking signal sufficient to cause every display element of the display to assume its first display state. If such a blanking signal is used in the fourth method of the invention, it is necessary, before step (a), to apply to the first subset of display elements, but not to the complement of the first subset, a third addressing signal, thereby causing the first subset of display elements to assume their first display state.

In both the third and fourth methods of the invention, desirably the sum of the integral of the amplitude of the first addressing signal as a function of time over the duration of the first addressing signal plus the integral of the amplitude of the second addressing signal as a function of time over the duration of the second addressing signal is substantially zero, i.e., the algebraic sum of the integral of the first addressing signal with respect to time and the integral of the second addressing signal with respect to time is substantially zero. When both a pre-blanking and a blanking signal are applied prior to step (a), it is also desirable that the algebraic sum of the integral of the pre-blanking signal with respect to time and the integral of the blanking signal with respect to time be substantially zero. In a preferred embodiment, this algebraic sum is smaller in absolute magnitude than 10 Volt-seconds; in a more preferred embodiment, smaller in absolute magnitude than 1 Volt-second; and in a still more preferred embodiment, smaller in absolute magnitude than 0.1 Volt-seconds. The methods can include the step of waiting for a pre-determined period of time after step (a). Also, as in the first and second methods described above, in the third and fourth methods of the invention either or both of the first and second addressing signals may comprise a plurality of addressing pulses.

The second and fourth methods of the invention previously described may be used to address a display having on one side thereof a common electrode extending across all the display elements of the set, and on the opposed side thereof a plurality of discrete electrodes, one of the discrete electrodes being associated with each of the display elements of the set. When the fourth method of the invention is used to address such a display, desirably the first addressing signal is provided by setting the common electrode to a first voltage and the discrete electrodes associated with the first subset of display elements to a second voltage different from the first voltage, while the second addressing signal is provided by setting the common electrode to the second voltage and the discrete electrodes associated with the second subset of display elements to the first voltage. This form of the fourth method of the invention may use the blanking and pre-blanking signals previously described, and if so the pre-blanking signal is conveniently provided by setting the common electrode to the second voltage and all the discrete electrodes to the first voltage, while the blanking signal is conveniently provided by setting the common electrode to the first voltage and all the discrete electrodes to the second voltage.

In yet another aspect, the present invention provides a fifth method of addressing a bistable display, this display comprising a set of display elements each having first and second display states differing in at least one optical property. This fifth method comprises (a) selecting a first subset of display elements that represent a first image, and applying to the first subset a first addressing signal, thereby causing the first subset to assume their first display state and the display to display the first image; (b) selecting a second subset of display elements that represent a second image different from the first image and thereby defining four classes of display elements, namely a first class which are members of both the first and second subsets, a second class which are members of the first subset but not members of the second subset, a third class which are not members of the first subset but are members of the second subset, and a fourth class which are not members of either the first or the second subset, and applying to the second class a second addressing signal, thereby setting the second class to their second display state, and applying to the third class a third addressing signal, thereby setting the third class to their first display state, and causing the display to display the second image. In this fifth method, the display has on one side thereof a common electrode extending across all the display elements of the set, and on the opposed side thereof a plurality of discrete electrodes, one of the discrete electrodes being associated with each display element of the set, and the common electrode is kept at a substantially constant first voltage during steps (a) and (b).

In a preferred form of this fifth method, the discrete electrodes associated with at least one (and preferably both) of the first and fourth classes of display elements are kept at substantially the constant first voltage during steps (a) and (b). Also, desirable the second addressing signal is provided by setting the discrete electrodes associated with the second class of display elements to a second voltage substantially equal to the first voltage plus a predetermined difference, and the third addressing signal is provided by setting the discrete electrodes associated with the third class of display elements to a third voltage substantially equal to the first voltage minus the predetermined difference. Also, desirably the second and third addressing signals are each preceded by a pre-addressing signal, this pre-addressing signal being provided by setting the discrete electrodes associated with the second class of display elements to substantially the third voltage and the discrete electrodes associated with the third class of display elements to substantially the second voltage.

In yet another aspect, the present invention provides a sixth method of addressing a bistable display, comprising a set of display elements each having first and second display states differing in at least one optical property, the display having on one side thereof a common electrode extending across all the display elements of the set, and on the opposed side thereof a plurality of discrete electrodes, one of the discrete electrodes being associated with each display element of the set. The sixth method comprises (a) selecting a first subset of display elements that represent a first image; (b) selecting a second subset of display elements that represent a second image different from the first image and thereby defining four classes of display elements, namely a first class which are members of both the first and second subsets, a second class which are members of the first subset but not members of the second subset, a third class which are not members of the first subset but are members of the second subset, and a fourth class which are not members of either the first or the second subset, (c) bringing the display to a state in which the first and classes of display elements are in their first display state and the third and fourth classes are in their second display state, thereby causing the first image to be displayed; and (d) applying a first voltage to the common electrode for a first period and a different second voltage to the common electrode for a second period, while maintaining the discrete electrodes associated with at least one of the first and fourth classes of display elements at substantially the same voltages as the common electrode, and maintaining the discrete electrodes associated with one of the second and third classes of display elements substantially at the first voltage while maintaining the discrete electrodes associated with the other of the second and third classes substantially at the second voltage, thereby causing the first and third classes of display elements to be in their first display state and the second and fourth classes of display elements to be in their second display state, so that the display displays the second image. In a preferred form of this sixth method, in step (d) the discrete electrodes associated with both the first and fourth classes, of display elements are maintained at substantially the same voltage as the common electrode. Desirably, the first and second periods are substantially equal in duration.

In an especially preferred form of this sixth method, the common electrode is subjected to a plurality of cycles each comprising a first period in which the first voltage is applied and a second period in which the second voltage is applied, and the discrete electrodes associated with one of the second and third classes of display elements are maintained substantially at the first voltage and the discrete electrodes associated with the other of the second and third classes are maintained substantially at the second voltage throughout the plurality of cycles.

In yet another aspect, the present invention relates to a bistable display element having first and second display states differing in at least one optical property, and a signal control module that controls the signal applied to the display element, the signal control module applying at least a first addressing signal and at least a second addressing signal to the display element, the first addressing pulse not substantially changing the display state of the element and the second addressing signal changing the display state of the element. This signal control module is designed to carry out the first method of the invention. This invention also provides a similar bistable display element in association with a signal module arranged to apply at least first and second addressing signals to the display element, the first addressing pulse changing the display state of the element and the second addressing signal not substantially changing the display state of the element. This signal control module is designed to carry out the second method of the invention.

Embodiments of these aspects of the invention have the following features. The display element can be an electrophoretic display element, desirably an encapsulated electrophoretic display element. The electrophoretic display element may comprise a liquid and at least one particle disposed within this liquid and capable of moving therethrough on application of an electric field to the medium. Such an element may have a viewing surface and the liquid can have an optical property differing from that of the particle disposed therein so that the display element is in its first display state when the particle(s) lie(s) adjacent the viewing surface and in its second display state when the particle(s) is/are spaced from the viewing surface so that the liquid lies adjacent the viewing surface. Alternatively, the element may have a viewing surface and the liquid can have disposed therein at least one first particle having a first optical property and a first electrophoretic mobility and at least one second particle having a second optical property different from the first optical property and a second electrophoretic mobility different from the first electrophoretic mobility, so that the display element is in its first display state when the first particle(s) lie(s) adjacent the viewing surface and is in its second display state when the second particle(s) lie(s) adjacent the viewing surface.

The signal control module can apply a first addressing signal that has a first polarity and a second addressing signal that has a second polarity opposite the first polarity. Either or both of the first and second addressing signals can comprise a plurality of addressing pulses. The first addressing signal can have a first polarity, a first amplitude as a function of time and a first duration, and the second addressing signal can have a second polarity, a second amplitude as a function of time and a second duration, such that the sum of the first amplitude as a function of time integrated over the first duration and the second amplitude as a function of time integrated over the second duration is substantially zero.

BRIEF DESCRIPTION OF THE DRAWINGS

The invention is pointed out with particularity in the appended claims. The advantages of the invention described above, together with further advantages, may be better understood by referring to the following description taken in conjunction with the accompanying drawings. In the drawings, like reference characters generally refer to the same parts throughout the different views. Also, the drawings are not necessarily to scale, emphasis instead generally being placed upon illustrating the principles of the invention.

FIG. 2 depicts representations of time functions that embody various addressing signals used to address an electrophoretic display element, in which:

FIG. 3A is a diagrammatic side view of an embodiment of an addressing electrode structure for a particle-based display element in which a first addressing signal has been applied to the display element, and the particles are situated at the top surface of the display element.

FIG. 3B is a diagrammatic side view of an embodiment of an addressing electrode structure for a particle-based display element in which the particles are situated at the top surface of the display element, and a pre-addressing signal is applied to the display element before a first addressing signal is applied to the display element.

FIG. 3C is a diagrammatic side view of an embodiment of an addressing electrode structure for a particle-based display element in which a pre-addressing signal has first been applied to the display element, followed by the application of a second addressing signal, and the particles are situated at the bottom surface of the display element.

FIG. 3D depicts an embodiment of a negative pre-pulse and a positive addressing signal as a function of time.

FIG. 3E depicts another embodiment of a negative pre-pulse and a positive addressing signal as a function of time.

FIG. 3F depicts an embodiment of a positive addressing signal followed by a negative pulse as a function of time.

FIG. 4A depicts an embodiment of the set (set A) of elements that are active in displaying the letter "A."

FIG. 4B depicts an embodiment of the set (set B) of elements that are active in displaying the letter "B."

DETAILED DESCRIPTION OF THE INVENTION

Figure 1A:
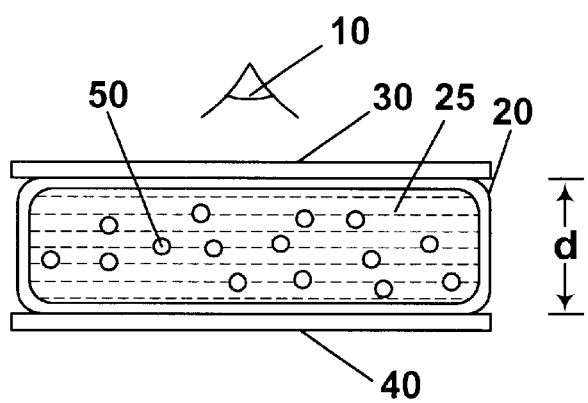
FIG. 1A is a diagrammatic side view of an embodiment of an addressing electrode structure for a particle-based display element in which no field has been applied to the display element, and the particles are dispersed throughout the element.

An object of the invention is to provide a long-lasting, highly-flexible, display that can be manufactured easily, consumes little or no power, and can, therefore, be incorporated into a variety of applications. Preferred embodiments of the invention feature methods of addressing a display comprising an encapsulated electrophoretic display medium that result in zero, or nearly zero, net time-averaged applied electric field. These methods of addressing reduce the net electric field stresses that are experienced by the display, lengthening the life of the electrophoretic display.

Encapsulated electrophoretic displays, and other types of bistable displays such as bichromal rotating ball displays, can be constructed so that the optical state of the display is stable for some length of time. As previously mentioned, when the display has two states that are stable in this manner, the display is said to be bistable. If more than two states of the display are stable, then the display can be said to be multistable. For the purpose of this invention, the term bistable will be used to indicate a display in which at least two optical states and in which, after an addressing voltage is removed, either of at least two optical states remains fixed for a period several times the minimum duration of the addressing pulse required to change the state of the display element. In practice, how long an optical state is required to remains stable depends on the application for the display. A slowly-decaying optical state can be effectively bistable if the optical state is substantially unchanged over the required viewing time. For example, in a display that is updated every few minutes, a display image that is stable for hours or days is effectively bistable for that application. In this invention, the term bistable also indicates a display with an optical state sufficiently long-lived as to be effectively bistable for the application in mind. Whether or not an encapsulated electrophoretic display is bistable, and its degree of bistability, can be controlled through appropriate chemical modification of the electrophoretic particles, the suspending fluid, the capsule, and binder materials.

Use of the word "printing" is intended to include all forms of printing and coating, including, but without limitation: pre-metered coatings such as patch die coating, slot or extrusion coating, slide or cascade coating, and curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; and other similar techniques. Thus, the resulting display can be flexible. Further, because the display media can be printed (using a variety of methods), the display itself can be made inexpensively.

Preferred embodiments of this invention provide encapsulated electrophoretic and other types of bistable display that provide a flexible, reflective display that can be manufactured easily and consume little power (or no power in the case of bistable displays in certain states), as well as materials and methods useful in their construction. Such displays, therefore, can be incorporated into a variety of applications. The display can be formed from and can include particles that move in response to an electric charge. This mode of operation is typical in the field of electrophoretics. A display in which the particles, ordered by an electric charge, take on a certain configuration can take on many forms. Additionally, providing a subsequent electric charge can alter a prior configuration of particles. Some encapsulated electrophoretic displays may include two or more different types of particles. Such displays may include, for example, displays containing a plurality of anisotropic particles and a plurality of second particles in a suspending fluid. Application of a first electric field may cause the anisotropic particles to assume a specific orientation and present an optical property. Application of a second electric field may then cause the plurality of second particles to translate, thereby disorienting the anisotropic particles and disturbing the optical property. Alternatively, the orientation of the anisotropic particles may allow easier translation of the plurality of second particles. The particles may have a refractive index that substantially matches the refractive index of the suspending fluid.

As already indicated, it is generally preferred that a display of the present. invention be an encapsulated electrophoretic display, and the following description of preferred embodiments of the invention will focus on such encapsulated electrophoretic displays, since it is believed that those skilled in display technology will have no difficulty in adapting the teachings below for use with other types of bistable displays, for example non-encapsulated electrophoretic displays and bichromal rotating ball displays.

An encapsulated electrophoretic display may take many forms. The display may include capsules dispersed in a binder. The capsules may be of any size or shape. The capsules may, for example, be spherical and may have diameters in the millimeter range or the micron range, but are preferably from about ten to about a few hundred microns. The capsules may be formed by an encapsulation technique. Particles may be encapsulated in the capsules. The particles may be two or more different types of particles. The particles may be colored, luminescent, light-absorbing or transparent, for example. The particles may include neat pigments, dyed (laked) pigments or pigment/polymer composites, for example. The display may further include a suspending fluid in which the particles are dispersed.

Generally, an encapsulated electrophoretic display includes a capsule with one or more species of particle that either absorb or scatter light and that are suspended in a fluid. One example is a system in which the capsules contain one or more species of electrophoretically mobile particles dispersed in a dyed suspending fluid. Another example is a system in which the capsules contain two separate species of particles suspended in a clear suspending fluid, in which one species of particle absorbs light (black), while the other species of particle scatters light (white). There are other extensions (more than two species of particles, with or without a dye, etc.). The particles are commonly solid pigments, dyed particles, or pigment/polymer composites.

In electrophoretic displays, the particles may be oriented or translated by placing an electric field across the capsule. The electric field may include an alternating-current field or a direct-current field. The electric field may be provided by at least one pair of electrodes disposed adjacent to a display comprising the capsule.

The successful construction of an encapsulated electrophoretic display requires the proper interaction of all these materials and processes. Materials such as a polymeric binder (for example, for binding the capsules to a substrate), electrophoretic particles, fluid (for example, to surround the electrophoretic particles and provide a medium for migration), and a capsule membrane (for example, for enclosing the electrophoretic particles and fluid) must all be chemically compatible. The capsule membranes may engage in useful surface interactions with the electrophoretic particles, or may act as an inert physical boundary between the fluid and the binder. Polymer binders may act as adhesives between capsule membranes and electrode surfaces.

Materials for use in creating electrophoretic displays relate to the types of materials, including, but not limited to, particles, dyes, suspending fluids, and binders used in fabricating the displays. In one embodiment, types of particles that may be used to fabricate suspended particle displays include scattering pigments, absorbing pigments and luminescent particles. Such particles may also be transparent. Exemplary particles include titania, which may be coated in one or two layers with a metal oxide, such as aluminum oxide or silicon oxide, for example. Such particles may be constructed as corner cubes. Luminescent particles may include, for example, zinc sulfide particles. The zinc sulfide particles may also be encapsulated with an insulative coating to reduce electrical conduction. Light-blocking or absorbing particles may include, for example, dyes or pigments. Types of dyes for use in electrophoretic displays are commonly known in the art. Useful dyes are typically soluble in the suspending fluid, and may further be part of a polymeric chain. Dyes may be polymerized by thermal, photochemical, and chemical diffusion processes. Single dyes or mixtures of dyes may also be used.

A suspending (i.e., electrophoretic) fluid may be a high resistivity fluid. The suspending fluid may be a single fluid, or it may be a mixture of two or more fluids. The suspending fluid, whether a single fluid or a mixture of fluids, may have its density substantially matched to that of the particles within the capsule. The suspending fluid may be halogenated hydrocarbon, such as tetrachloroethylene, for example. The halogenated hydrocarbon may also be a low molecular weight polymer. One such low molecular weight polymer is poly(chlorotrifluoroethylene). The degree of polymerization for this polymer may be from about 2 to about 10.

Furthermore, capsules may be formed in, or later dispersed in, a binder. Materials for use as binders include water-soluble polymers, water-dispersed polymers, oil-soluble polymers, thermoset polymers, thermoplastic polymers, and radiation-cured (for example, UV-cured) polymers. The materials used as substrates to support and as electrodes to address electrophoretic displays must also be compatible with the materials and processes that are described above.

While the examples described here are listed using encapsulated electrophoretic displays, there are other particle-based display media that also should work well, including encapsulated suspended particles and rotating ball displays. Other display media, such as magnetic particles, also can be useful.

In some cases, a separate encapsulation step of the process is not necessary. The electrophoretic fluid may be directly dispersed or emulsified into the binder (or a precursor to the binder material) to form what may be called a "polymer-dispersed electrophoretic display." In such displays, the individual electrophoretic phases may be referred to as capsules or microcapsules even though no capsule membrane is present. Such polymer-dispersed electrophoretic displays are considered to be subsets of encapsulated electrophoretic displays.

In an encapsulated electrophoretic display, the binder material surrounds the capsules and separates the two bounding electrodes. This binder material must be compatible with the capsule and bounding electrodes and must possess properties that allow for facile printing or coating. It may also possess barrier properties for water, oxygen, ultraviolet light, the electrophoretic fluid, or other materials, Further, it may contain surfactants and cross-linking agents, which could aid in coating or durability. The polymer-dispersed electrophoretic display may be of the emulsion or phase separation type.

An electronic ink is an optoelectronically active material which comprises at least two phases: an electrophoretic contrast media phase and a coating/binding phase. The electrophoretic phase comprises, in some embodiments, a single species of electrophoretic particles dispersed in a clear or dyed medium, or more than one species of electrophoretic particles having distinct physical and electrical characteristics dispersed in a clear or dyed medium. In some embodiments the electrophoretic phase is encapsulated, that is, there is a capsule wall phase between the two phases. The coating/binding phase includes, in one embodiment, a polymer matrix that surrounds the electrophoretic phase. In this embodiment, the polymer in the polymeric binder is capable of being dried, crosslinked, or otherwise cured as in traditional inks, and therefore a printing process can be used to deposit the electronic ink onto a substrate. An electronic ink is capable of being printed by several different processes, depending on the mechanical properties of the specific ink employed. For example, the fragility or viscosity of a particular ink may result in a different process selection. A very viscous ink would not be well-suited to deposition by an ink jet printing process, while a fragile ink might not be used in a knife over roll coating process.

The optical quality of an electronic ink is quite distinct from other electronic display materials. The most notable difference is that the electronic ink provides a high degree of both reflectance and contrast because it is pigment based (as are ordinary printing inks). The light scattered from the electronic ink comes from a very thin layer of pigment close to the top of the viewing surface. In this respect it resembles an ordinary, printed image. Also, electronic ink is easily viewed from a wide range of viewing angles in the same manner as a printed page, and such ink approximates a Lambertian contrast curve more closely than any other electronic display material. Since electronic ink can be printed, it can be included on the same surface with any other printed material, including traditional inks. Electronic ink can be made optically stable in all display configurations, that is, the ink can be set to a persistent optical state. Fabrication of a display by printing an electronic ink is particularly useful in low power applications because of this stability.

Electronic ink displays are novel in that they can be addressed by DC voltages and draw very little current. As such, the conductive leads and electrodes used to deliver the voltage to electronic ink displays can be of relatively high resistivity. The ability to use resistive conductors substantially widens the number and type of materials that can be used as conductors in electronic ink displays. In particular, the use of costly vacuum-sputtered indium tin oxide (ITO) conductors, a standard material in liquid crystal devices, is not required. Aside from cost savings, the replacement of ITO with other materials can provide benefits in appearance, processing capabilities (printed conductors), flexibility, and durability. Additionally, the printed electrodes are in contact only with a solid binder, not with a fluid layer (like liquid crystals). This means that some conductive materials, which would otherwise dissolve or be degraded by contact with liquid crystals, can be used in an electronic ink application. These include opaque metallic inks for the rear electrode (e.g., silver and graphite inks), as well as conductive transparent inks for either substrate. These conductive coatings include semiconducting colloids, examples of which are indium tin oxide and antimony-doped tin oxide. Organic conductors (polymeric conductors and molecular organic conductors) also may be used. Polymers include, but are not limited to, polyaniline and derivatives, polythiophene and derivatives, poly(3,4-ethylenedioxythiophene) (PEDOT) and derivatives, polypyrrole and derivatives, and polyphenylenevinylene (PPV) and derivatives. Organic molecular conductors include, but are not limited to, derivatives of naphthalene, phthalocyanine, and pentacene. Polymer layers can be made thinner and more transparent than with traditional displays because conductivity requirements are not as stringent.

As an example, there is a class of materials called electroconductive powders which are also useful as coatable transparent conductors in electronic ink displays. One example is Zelec ECP electroconductive powders from DuPont Chemical Co. of Wilmington, Del.

Figure 1B:
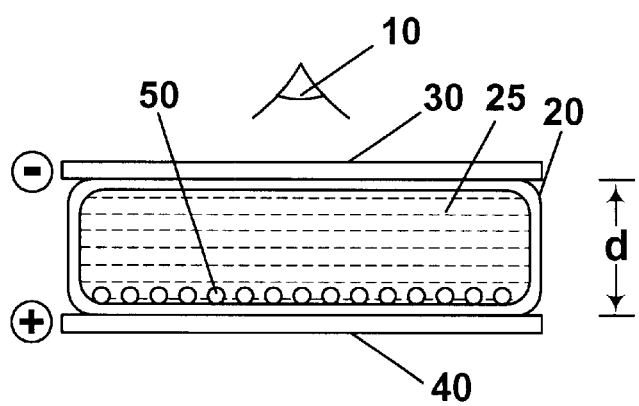
FIG. 1B is a diagrammatic side view of an embodiment of an addressing electrode structure for a particle-based display element in which the bottom electrode has been placed at a voltage relative to the top electrode causing the particles to migrate to the bottom electrode.
Figure 1C:
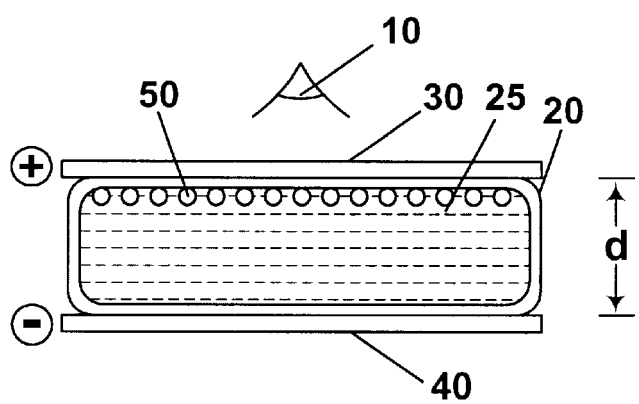
FIG. 1C is a diagrammatic side view of an embodiment of an addressing electrode structure for a particle-based display element in which the bottom electrode has been placed at a voltage relative to the top electrode causing the particles to migrate to the top electrode.

Referring now to FIGS. 1A, 1B and 1C, an addressing scheme for controlling particle-based displays is shown in which electrodes are disposed on both sides of a display, allowing the display to be addressed according to the present invention. The top electrode can be fabricated from a conductive material that is transparent, such as indium tin oxide ("ITO"), to permit the state of the display element to be observed through the top electrode.

FIG. 1A depicts a single capsule 20 of an encapsulated display element. In brief overview, the embodiment depicted in FIG. 1A includes a capsule 20 containing at least one particle 50 dispersed in a suspending fluid 25. The capsule 20 is addressed by a first electrode 30 and a second electrode 40. In one embodiment, the first electrode 30 is situated on the top of the capsule 20 of the display element, while the second electrode 40 is situated below the capsule 20 of the display element. The first electrode 30 and the second electrode 40 may be set to voltage potentials which affect the position of the particles 50 in the capsule 20.

The particles 50 represent 0.1% to 20% of the volume enclosed by the capsule 20. In some embodiments the particles 50 represent 2.5% to 17.5% of the volume enclosed by capsule 20. In preferred embodiments, the particles 50 represent 5% to 15% of the volume enclosed by the capsule 20. In more preferred embodiments the particles 50 represent 9% to 11% of the volume defined by the capsule 20. In general, the volume percentage of the capsule 20 that the particles 50 represent should be selected so that the particles 50 provide the predominant visual effect when positioned at the top surface of the capsule 20. As described in detail below, the particles 50 may have any one of a number of optical characteristics, such as color, reflectance, retroreflectance and luminescence. The particles 50 may be either positively charged or negatively charged.

The particles 50 are dispersed in a dispersing fluid 25. The dispersing fluid 25 should have a low dielectric constant. The fluid 25 may be clear, or substantially clear, so that the fluid 25 does not inhibit viewing the particles 50 and the bottom electrode 40 from position 10. In other embodiments, the fluid 25 is dyed. In some embodiments the dispersing fluid 25 has a specific gravity matched to the density of the particles 50. These embodiments can provide a bistable display media, because the particles 50 do not tend to move in certain compositions absent an electric field applied via the electrodes 30, 40.

The electrodes 30, 40 should be sized and positioned appropriately so that together they address the entire capsule 20. There may be exactly one pair of electrodes 30, 40 per capsule 20, multiple pairs of electrodes 30, 40 per capsule 20, or a single pair of electrodes 30, 40 may span multiple capsules 20. In the embodiment shown in FIGS. 1A–1C, the capsule 20 has a flattened, rectangular shape. In these embodiments, the electrodes 30, 40 should address most, or all, of the flattened surface area adjacent the electrodes 30, 40.

Electrodes may be fabricated from any material capable of conducting electricity so that electrode 30, 40 may apply an electric field to the capsule 20. The embodiments depicted in FIGS. 1A–1C allow the electrode 40 to be fabricated from opaque materials such as solder paste, copper, copper-clad polyimide, graphite inks, silver inks and other metal-containing conductive inks. Electrodes 30 may be fabricated using transparent materials such as indium tin oxide and conductive polymers such as polyaniline or polythiophenes. Electrode 40 may also be fabricated using transparent materials. Electrode 40 may be provided with contrasting optical properties. In some embodiments, the electrode 40 has an optical property complementary to optical properties of the particles 50.

In one embodiment, the capsule 20 contains positively charged black particles 50, and a dyed suspending fluid 25. The top electrode 30 is clear, and the bottom electrode 40 is opaque. When the top electrode 30 is placed at a negative voltage potential relative to bottom electrode 40, the positively-charged particles 50 migrate to the top electrode 30. The effect to a viewer of the capsule 20 located at position 10 is a capsule having a front surface covered with black particles 50, creating an effect that is largely black. Referring to FIG. 1B, when the top electrode 30 is placed at a positive voltage potential relative to the bottom electrode 40, particles 50 migrate to the bottom electrode 40 and the viewer is presented a view of the dyed suspending fluid 25 that is observed through the transparent top electrode 30, creating an effect which is largely the appearance of the dyed suspending fluid 25. In this manner the capsule 20 may be addressed to display either a visual state characteristic of the dyed fluid 25 or a black visual state.

Other two-color schemes are easily provided by varying the color of the suspending fluid 25 and the particles 50. For example, varying the color of the suspending fluid 25 allows fabrication of a two-color display having black as one of the colors. Alternatively, varying the color of the particles 50 allows a two-color system to be fabricated having the color of the dyed suspending fluid 25 as one of the colors. In certain embodiments, the particles 50 exhibit bistability, that is, they are substantially motionless in the absence of an electric field.

Figure 1D:
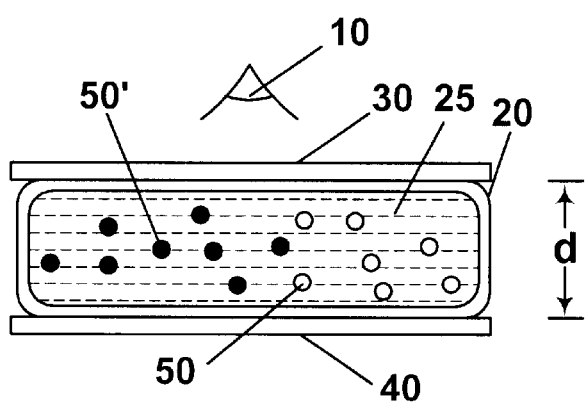
FIG. 1D is a diagrammatic side view of an embodiment of an addressing electrode structure for a particle-based display element in which no field has been applied to the display element, and two species of particles are dispersed throughout the element.

Another alternative embodiment, depicted in FIG. 1D, can be constructed using two species of particles 50, 50' having two different colors, and two different charges, such that one of the species, for example 50, moves toward the top electrode 30 when a first potential is applied across the electrodes 30 and 40, and the other species of particles, 50', moves toward the top electrode 30 when a second potential is applied across the electrodes 30 and 40. Note that in FIG. 1D as shown there is no field applied between top electrode 30 and bottom electrode 40. For example, the first species of particles 50 can be black and positively charged, while the second species of particles 50' can be white and negatively charged. In such an embodiment, when the top electrode 30 is held at a more positive potential than electrode 40, the white, negative particles 50' move toward the top electrode 30 and the black, positive particles 50 move toward the bottom electrode 40, causing the capsule to have a white visual appearance characteristic of the particles 50'. When the top electrode 30 is held at a more negative potential than electrode 40, the white, negative particles 50' move toward the bottom electrode 40 and the black, positive particles 50 move toward the top electrode 30, causing the capsule to have a black visual appearance characteristic of the particles 50. In other two color embodiments, an appropriate choice of the colors of the positive and the negative particles can permit an electrophoretic element that can display two desired colors to be realized.

FIG. 2 depicts representations of time functions that embody various addressing signals used to address an electrophoretic display element, such as that depicted in FIGS. 1A–1C. An addressing signal can be applied across electrodes 30 and 40 in order to apply an electric field to the electrophoretic display element. For the purposes of this discussion, a positive, or a positive-going, signal will be taken as one that places a more positive voltage potential on electrode 30 and a less positive voltage potential on electrode 40. A negative, or negative-going, signal will be taken as one of opposite polarity, that is, one with a less positive voltage potential on electrode 30 and a more positive voltage potential on electrode 40.

In general, one can characterize an addressing signal as an electrical signal that can vary with time, e.g., as an electrical signal that has an amplitude that is a function of time, the amplitude expressed in units of volts, and that has a duration that can be expressed in units of seconds. The generation of such signals is well known. In one embodiment, such signals can conveniently be generated with a power source, such as a battery or some other source of electricity, and suitable signal conditioning apparatus, such as resistors, inductors, capacitors, and switches. Alternatively, one can obtain such signals from programmable signal generators. Various examples of types of electrical addressing signals that may be employed in embodiments of the invention are presented below. In general, one can characterize an addressing signal by its amplitude as a function of time, its duration and its polarity. As a general rule, a measure of an area bounded by the graph of the signal and the time axis may be found by the mathematical process of integrating the instantaneous amplitude of the signal over the duration of the signal. If a signal is represented by a function that is not integrable in closed form, one can always estimate the area to any desired precision by integration of an upper bounding piecewise linear function and a lower bounding piecewise linear function. Such an area, expressed in volt-seconds, can serve as a measure of the magnitude of the applied signal.

Figure 2A:
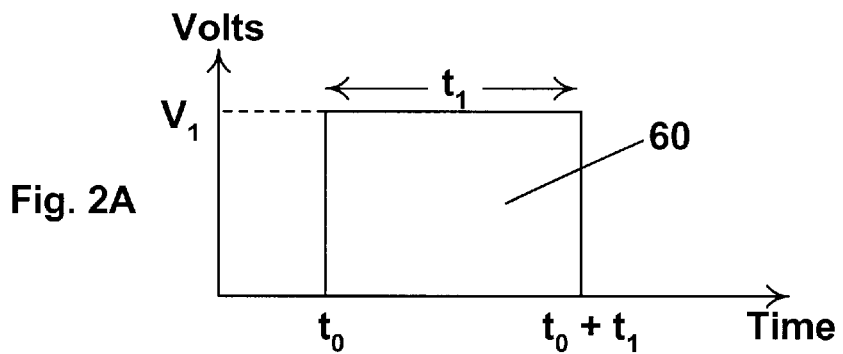
FIG. 2A is a representation of a square wave signal.

FIG. 2A is a representation of a square wave signal 60. An embodiment of an electrical signal of the kind shown in FIG. 2A has an amplitude expressed as a constant value of $V_1$ volts during a time period having a duration from $t_o$ to $t_o+t_1$, which can be expressed as $t_1$ seconds. The square wave signal 60 has an area given by $V_1 * t_1$ volt-seconds.

Figure 2B:
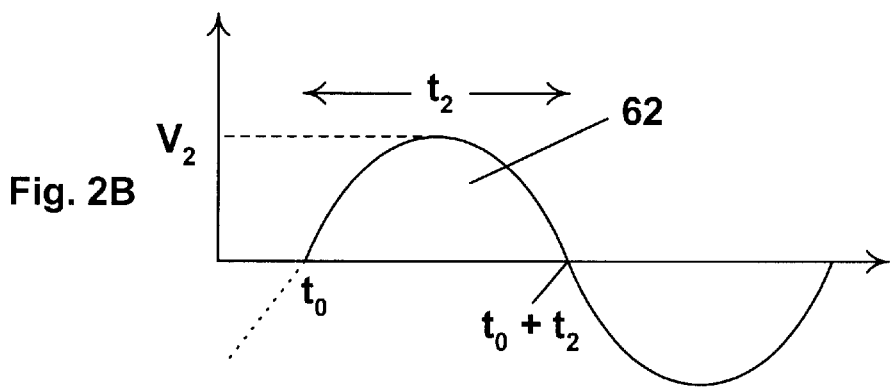
FIG. 2B is a representation of a sinusoidal signal.

FIG. 2B is a representation of a sinusoidal signal 62. An embodiment of an electrical signal of the kind shown in FIG. 2B has an amplitude expressed as a time varying value with a maximum amplitude of V2 volts given by the relation $V_2 \sin(t)$ during a time period having a duration from $t_0$ to $t_0+t_2$, which can be expressed as $t_2$ seconds. The sinusoidal signal 62 has an area given by $$V_2 \int \sin(t) dt$$

over the range $t_0$ to $t_0+t_2$, or $V_2[-\cos(t_0+t_2)+\cos(t_0)]$ volt-seconds.

Figure 2C:
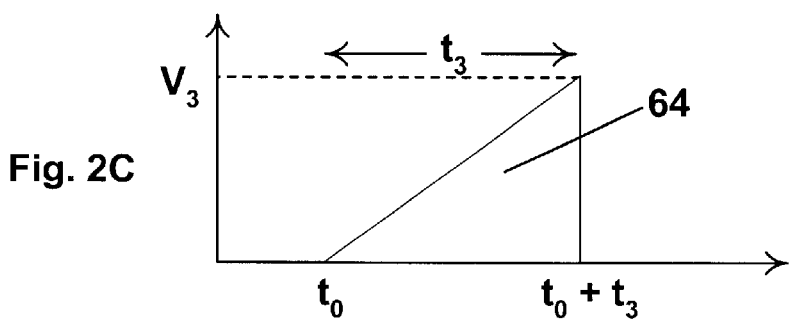
FIG. 2C is a representation of a sawtooth signal.

FIG. 2C is a representation of a sawtooth signal 64. An embodiment of an electrical signal of the kind shown in FIG. 2C has an amplitude expressed as a time varying value with a maximum amplitude of $V_3$ volts during a time period having a duration from $t_0$ to $t_0+t_3$, which can be expressed as $t_3$ seconds. The sawtooth signal 64 has an area given by $\frac{1}{2}V_3 * t_3$ volt-seconds.

Figure 2D:
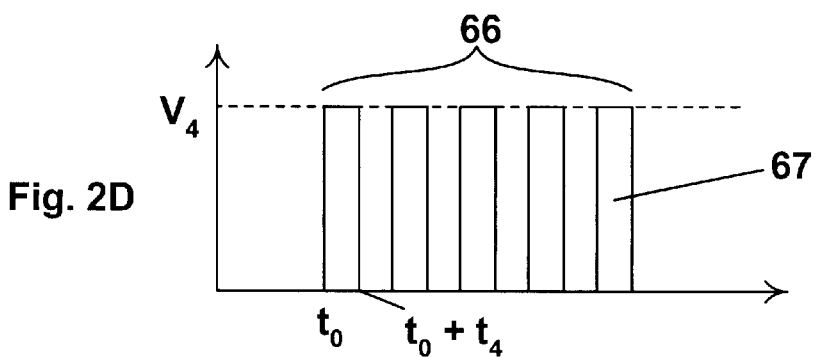
FIG. 2D is a representation of a signal composed of a series of pulses.

FIG. 2D is a representation of a signal 66 composed of a series of pulses 67. An embodiment of an electrical signal of the kind shown in FIG. 2D has a plurality of pluses, where each pulse 67 is a rectangular signal of amplitude $V_4$ and of duration $t_4$. Thus the area of each pulse is $V_4 t_4$, and the area of all 5 pulses is $5\ V_4 t_4$ volt-seconds.

Figure 2E:
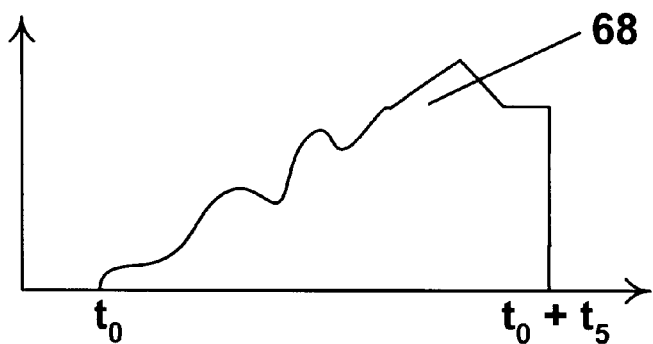
FIG. 2E is a representation of a signal having an arbitrary amplitude as a function of time.

FIG. 2E is a representation of a signal 68 having an arbitrary amplitude as a function of time. An embodiment of an electrical signal of the kind shown in FIG. 2E has an arbitrary amplitude as a function of time, and a duration given by $t_0$ to $t_0+t_5$, or $t_5$. The area of this electrical signal would have to be computed by the method of calculating an upper and a lower bounding area, and taking an intermediate value.

One can also add together the effects of a plurality of electrical signals. In particular, if one were to add the effects of any signal followed by another signal that was the negative of the first, such as the first signal reflected about the time axis or x-axis and delayed by the duration of the first signal, the net signal would be zero.

Figure 2F:
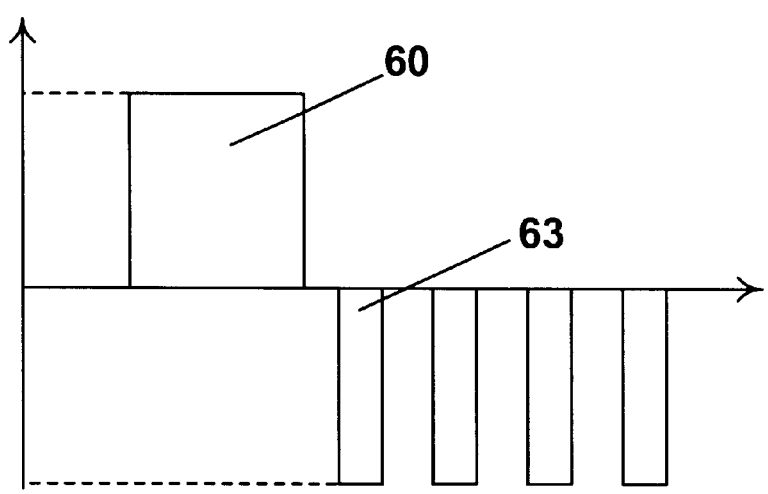
FIG. 2F is a representation of a signal comprising a positive square wave signal and a negative signal comprising a series of pulses.

FIG. 2F is a representation of a signal comprising a positive rectangular wave signal 60 and a series of negative pulse signals 63. In an embodiment of the signal depicted in FIG. 2F, if the amplitudes and durations are correctly chosen, one can have the area represented by rectangle 60 measured by a value that is equal and opposite in sign to the area represented by the sum of the negative areas of the pulses 63. The net value of the sum of the areas of the positive rectangular wave signal 60 and the negative pulses 63 would thus be zero, and the signal embodied by FIG. 2F would thus apply no net field to a display upon which it acted. This may be viewed as a zero net time average signal.

Figure 2G:
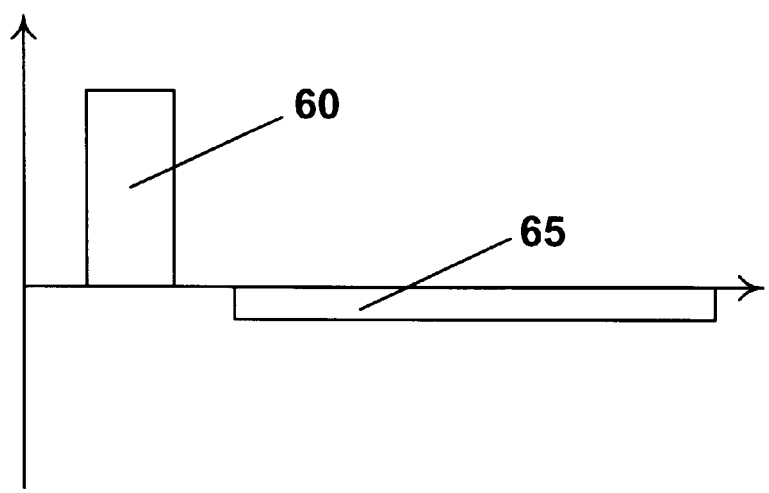
FIG. 2G is a representation of a signal comprising a positive square wave signal and a negative rectangular signal.

Another signal that may be selected to apply no net field to an electrophoretic display element upon which it acts is depicted in FIG. 2G. This signal comprises a positive square or rectangular signal 60 having a larger amplitude and a shorter duration than the negative-going rectangular signal 65 that follows. However, if the product of the amplitude times the duration of signal 60 is numerically equal in magnitude and opposite in sign to the product of the magnitude times the duration of signal 65, the net applied signal would be zero, and the time average of the combined signals 60 and 65 would also be zero.

The above examples are illustrative of some of the many kinds of signals that may be employed as addressing signals, but this discussion is not meant to be exhaustive. It will be clear to those of ordinary skill in the art that there are many additional kinds of signals, and many combinations of positive-going and negative-going addressing signals, that could be applied to electrodes 30 and 40. Many possible choices of addressing signals can be selected to result in a net zero applied field and a net zero time average signal across the capsule 20.

The application of combinations of addressing signals that result in a net zero time average signal can be used to reduce the degradation of the materials used in constructing the electrophoretic display elements. The degradation in the behavior of the electrophoretic display elements can also be reduced. The method by which a reduction in degradation can be accomplished will now be described.

FIG. 3A is a diagrammatic side view of an embodiment of an addressing electrode structure for a particle-based display element in which a first addressing signal has been applied to the display element at some time in the past, and the particles 50 are situated at the top surface of the display element. As depicted in FIG. 3A, the addressing signal has been removed after the display element attained the desired configuration. If the positively charged particles 50 are black, and the suspending fluid 25 is dyed, an observer viewing the display element from position 10 would see a substantially black display. In order to change the state of the display to the appearance of the dyed fluid, one must apply a positive signal to the electrodes 30, 40. This positive signal must provide a relatively positive voltage potential of sufficient magnitude applied to electrode 30 arid a relatively negative voltage potential applied to electrode 40, repelling the positive particles 50 from electrode 30 and attracting them to electrode 40. The addressing signal must be applied for a long enough period of time to allow the positive black particles 50 to migrate from the top of the capsule 20 to the bottom of the capsule 20, leaving the dyed suspending fluid 25 to be observed by the observer at position 10, as depicted in FIG. 3C. The display element will then present substantially the visual appearance of the dyed suspending fluid 25.

Rather than applying the required positive addressing signal alone to the electrophoretic display element capsule 20 and its contents, it is possible to apply a pre-addressing signal to the electrophoretic display element to condition it. FIG. 3B is a diagrammatic side view of an embodiment of an addressing electrode structure for a particle-based display element in which the particles are situated at the top surface of the display element, and a pre-addressing signal is applied to the display element before a first addressing signal is applied to the display element. In FIG. 3B, the pre-addressing signal is one of negative polarity, so that a relatively negative voltage potential appears on electrode 30 and a relatively positive voltage potential appears on electrode 40. The electrostatic force that is applied to each of positive particles 50 is depicted by the arrow 27. The positive particles 50 are pressed against the internal surface of the uppermost part of capsule 20 as a result of the pre-addressing negative signal. In response to this pre-addressing signal, there is substantially no movement of the black particles 50, which are already situated in close proximity to the inner surface of the capsule 20 located closest to electrode 30. However, the pre-addressing signal serves to pre-stress the electrophoretic display element and the materials from which it is constructed. This pre-stress is in the direction opposite that which is required to change the visual state of the display.

FIG. 3C is a diagrammatic side view of an embodiment of an addressing electrode structure for a particle-based display element in which a pre-addressing signal has first been applied to the display element, followed by the application of a second addressing signal, and the particles are situated at the bottom surface of the display element. When a second addressing signal is applied to the display element, which in the discussion of the present embodiment is a positive addressing signal, a relatively more positive voltage potential appears at the top electrode 30 and a relatively more negative voltage potential appears at the bottom electrode 40. The positive black particles 50 thus experience a repulsive force from electrode 30 and an attractive force from electrode 40, which net force is depicted as an arrow 28. The positive black particles 50 are caused to move to the bottom of the display element. The electrophoretic display element will appear to an observer situated at position 10 as a display having the characteristic appearance of the dyed fluid, because the observer will see only the dyed suspending fluid 25. To the extent that the second addressing signal is the same magnitude and duration as the pre-addressing signal, but opposite in polarity to the pre-addressing signal, arrow 27 depicted in FIG. 3B and arrow 28 will be equal in magnitude and opposite in direction.

The application of a pre-addressing pulse that has a first polarity, a first magnitude as a function of time and a first duration, followed by the second addressing signal that has the opposite polarity, and a second magnitude as a function of time and a second duration can result in a net zero average applied field if the integral of the first magnitude as a function of time integrated over the first duration is numerically equal to the integral of the second magnitude as a function of time integrated over the second duration. This is the most general expression of the condition that will result in a net zero average applied field. Many signals may be evaluated without resort to sophisticated mathematics. For example, for addressing signals or pre-addressing signals that have rectangular, or triangular, waveforms, one can determine the area under the signal represented in volt-seconds by simple multiplication. Many other signals, for example, signals based on sinusoids, exponentials, and step functions, as well as their integrals and derivatives, can be treated by the application of the methods of calculus. Signals which are not amenable to closed form mathematical integration may be treated by obtaining a value bounded from above and from below by application of numerical integration methods.

FIG. 3D depicts an embodiment of addressing signals that satisfy the conditions described above. A display element in the condition depicted in FIG. 3A is provided at an arbitrary time denoted by t=0. At a time $t_1$ a negative pulse 2 of amplitude $-V_0$ is applied across electrodes 30 and 40 as depicted in FIG. 3B. This negative pulse is maintained until time $t_2$, for a duration given by $t_2-t_1$. At a time $t_3$, a positive signal 4 of amplitude $V_0$ is applied across electrodes 30 and 40, as depicted in FIG. 3C. The positive signal 4 can be applied immediately after the negative pulse 2, or it can be applied after a delay. Here FIG. 3D incorporates a delay. The positive signal 4 is applied for a duration given by $t_4-t_3$ which is equal in duration to the duration $t_2-t_1$. The strength of the negative pulse 2 is thus equal and opposite to that of the positive signal 4. The net effect of applying the pulse 2 and the signal 4 is the change of state of the display element from that depicted in FIG. 3A to that depicted in FIG. 3C with zero average net field having been applied to the display element.

Other embodiments are depicted in FIGS. 3E and 3F using rectangular shaped waveforms as examples. In FIG. 3E, the negative pulse 12 of amplitude −2 units of voltage and duration of 3 units of time precedes the positive addressing signal 14, which is of amplitude 3 units of voltage and has a duration of 2 units of time. In FIG. 3F, the positive addressing signal 16 can precede the negative pulse 18 so long as the negative pulse does not have sufficient amplitude to cause the particles 50 to move within capsule 20. In the embodiment depicted in FIG. 3F, the negative pulse 18 and the positive signal 16 have equal strength as measured by the area of each. In another embodiment, the negative waveform may be comprised of a series of pulses.

It will be appreciated that the signal shown in FIG. 2G is especially suitable for carrying out the second method of the present invention. As previously mentioned, many bistable displays, especially electrophoretic displays, exhibit a threshold behavior such that signals below a certain threshold value do not cause the display to change its display state even if the signal is applied for a long time, whereas a signal above the threshold will cause a rapid change in display state. It is believed (although the invention is in no way limited by this belief) that at least part of the explanation for such threshold behavior in encapsulated electrophoretic displays is a limited adhesion of the particles to the capsule wall; signals below the threshold are not sufficient to remove the particle from the wall, so that such signals can be applied for a long period without moving the particles and hence without changing the optical state of the display, whereas application of a signal in excess of the threshold will detach the particles from the wall, whereupon the particles will move rapidly through the liquid and cause change in the display state of the display.

For example, consider the application of the signals shown in FIG. 2G to the capsule 20 shown in FIG. 1B, which is in its second display state with the particles spaced from the viewing surface (the upper surface as shown in FIG. 1B). The positive-going signal 60 substantially exceeds the threshold of the capsule, and hence the particles 50 move through the liquid 25 and within a short time the capsule is in its first display state, as shown in FIG. 1C, with the particles lying adjacent the viewing surface of the capsule. When the negative-going signal 65, which has an amplitude below the threshold of the capsule, is then applied to the capsule, the particles remain adjacent the viewing surface of the capsule, which thus remains in its first display state.

Typically, because of the need to keep the signal 65 below the threshold of the capsule, the amplitude of the signal 65 will need to be not more than about one-fifth, and in most cases not more than about one-tenth, of the amplitude of the signal 60. (Note, however, that the threshold of a capsule may be deliberately increased using the techniques described in copending application Ser. No. 60/132,303, filed May 3, 1999, the entire disclosure of which is herein incorporated by reference). Thus, to produce zero net time average signal, the duration of the signal 65 typically needs to be at least five, and in most cases at least ten, times the duration of the signal 60. Thus, the total duration of the "cycle" shown in FIG. 2G is likely to be substantially greater than that of, for example, a cycle such as that shown in FIG. 3D, in which the durations of the signals 2 and 4 are equal. Although, the longer duration of the cycle shown in FIG. 2G can be disadvantageous because it limits the frequency at which the display state can be changed, there are certain applications in which the "post-balancing" technique (i.e., using a non-state-changing signal following the state-changing signal) of the second method of the present invention may be preferred over the "pre-balancing" technique (i.e., using a non-state-changing signal before the state-changing signal) of the first method of the present invention. For example, if the display is being used as a warning device to indicate some unusual or alarm condition, for obvious reasons it is advantageous to apply the state-changing signal first, thus immediately advising the operator of the unusual or alarm condition, while the long duration of the non-state-changing signal, which merely delays turning the alarm signal off, is of little concern.

In the process of addressing a display having a plurality of pixels or elements, it is necessary to change the state of one or more pixels when the image that is being displayed is altered. As an example, one can describe an embodiment of the addressing process of the present invention using alphanumeric characters. The process can be equally applied to graphic images, and to symbols such as those used in mathematical or other specialized notation, or to arbitrary combinations of alphanumeric characters, graphic images and other symbols.

Figure 4A:
FIGS. 4A and 4B depict an embodiment of the logic used in addressing individual display elements or pixels to minimize the number of display elements that must change state to change the image depicted by the display, using the letters "A" and "B" as an example.
Figure 4B:

FIGS. 4A and 4B depict an embodiment of the logic used (in the third method of the present invention) in addressing individual display elements or pixels of a bistable display to minimize the number of display elements that must change state to change the image depicted by a display. FIGS. 4A and 4B show a 9×7 rectangular array or set 200 of pixels, in which the columns are labeled with the letters A through G, and the rows are labeled with the numerals 1 through 9, so that any square in the 9×7 rectangular array 200 may be denoted by a letter followed by a numeral. For example, the square in the uppermost row and the leftmost column is the square "A1." Each of the pixels in the array 200 has a second display state (assumed to be white and shown blank in FIGS. 4A and 4B) and a first display state differing from the second in at least one optical property; in FIGS. 4A and 4B this first display state is assumed to be dark and is indicated by placing an "X", "Y" or "Z" in the relevant square (this use of "X", "Y" and "Z" is only for purposes of the explanation below, there is no visual difference between the pixels in the three cases, all "X", "Y" or "Z" pixels being uniformly dark).

FIG. 4A shows the array 200 displaying a representation of the letter "A." The letter A depicted in FIG. 4A is composed of a first subset of squares containing the letter "X" or "Y", namely squares B4 through B8, C3, C5, D2, D5, E3, E5 and F4 through F8. One can denote this first subset of active squares as:

$$A=(B4,B5,B6,B7,B8,C3,C5, D2,D5,E3,E5,F4,F5,F6,F7,F8).$$

FIG. 4B shows the array 200 displaying a representation of the letter "B." This letter B is composed of a second subset of squares containing the letter "X" or "Z", namely squares B2 through B8, C2, C5, C8, D2, D5, D8, E2, E5, E8 and F3, F4, F6 and F7. One can denote this second subset of active squares as:

$$B=(B2,B3,B4,B5,B6,B7,B8,C2, C5,C8,D2,D5,D8,E2,E5,E8,F3,F4, F6,F7).$$

Inherently, the two subsets A and B define three classes of pixels. The first class, denoted by the letter "X" in FIGS. 4A and 4B, is composed of pixels which are in their first optical state in both the depiction of the letter "A" and the depiction of the letter "B", i.e., which are members of both the sets A and B. In mathematics, the intersection of two sets is given by the list of elements that are common to the two sets, and is denoted symbolically by the operator symbol ∩, as in A∩B is the intersection of the sets A and B. In this example, a comparison of the depictions of the letters "A" and "B" as given in FIGS. 4A and 4B, respectively, demonstrates that the intersection of the active squares that comprise the subsets A and B is given by the equation $$A∩B=(B4,B5,B6,B7,B8,C5,D2,D5,E5,F4,F6,F7).$$

The first class of pixels defined by this intersection of A and B is denoted by "X" in FIGS. 4A and 4B.

The second class of pixels is composed of the pixels which are members of subset A but are not members of subset B, in other words the pixels which are active in the representation of "A" but not in the representation of "B". This second class of pixels is defined as the subset A minus (A∩B), or A–(A∩B)=(C3, E3, F5, F8), and are denoted "Y" in FIG. 4A.

The third class of pixels is composed of the pixels which are not members of subset A but are members of subset B, in other words the pixels which are not active in the representation of "A" but are active in the representation of "B". This third class of pixels is defined as the subset B minus (A∩B), or B–(A∩B)=(B2, B3, C2, C8, D8, E2, E8, F3), and are denoted "Z" in FIG. 4B. (The subsets A and B also, of course, define a fourth class of pixels which are not members of either subset. However, this fourth class of pixels can be ignored for present purposes.)

With these three classes so defined, it is possible to demonstrate the minimum number of elements that must change state (i.e., being changed from "on" to "off," or vice versa) in order to convert a display showing a letter "A" to one showing a letter "B." In order to perform this conversion of what is displayed, one must at the least turn off those elements (the second class) in the letter "A" that are not active in the letter "B" and turn on those elements (the third class) of the letter "B" that are not active in displaying the letter "A." The active elements (the first class) that are common to the letters "A" and "B" can remain on, or active, at all times during the process. This series of steps can be expressed in mathematical terms as follows.

It is possible to perform the conversion of "A" to "B" by performing the step of turning off the second class of elements before, at the same time as, or after performing the step of turning on the third class of elements needed to complete the letter "B" because these two classes are disjoint, that is they contain no common element at all. The second and third classes can be addressed as groups or as individual elements. The classes can each be addressed simultaneously or sequentially, and if sequentially, in any order.

The use of methods that involve a pre- or post-pulse that sums to zero with the addressing signal assures that the net signal on any display element will be zero. The possible exception to this general observation can be an initial addressing signal that can be required to bring a display element into a known state (e.g., either on or off). However, a single uncompensated signal will be of minimal effect on a display element that can be operated many times over its active lifetime. With the further use of methods that minimize the number of elements that must be addressed in the process of displaying an image, the number of state changes that display elements must undergo will in general be held to a minimum as well, thereby minimizing the deleterious effect of addressing signals on the materials of construction.

For displays that are addressed to exhibit images such as alphanumeric characters, the elements which must be turned off and the elements which must be turned on to go from an "A" to a "B" will always be the same elements, so one can determine the addresses of the elements that need to be changed once and record the list for future use. One also notes that the same list can be used in the inverted sense to go from a display showing the letter "B" to one showing the letter "A." That is, the elements turned on in going from "A" to "B" are the elements turned off in going from "B" to "A" and the elements turned off in going from "A" to "B" are the ones that are turned on in going from "B" to "A." By the same logic, any two images that will occupy the same region of the display can be evaluated as to the minimum number of elements that must change state. By extension of the analytical method to either or both multiple display states (for example, multiple colors) and images that appear to "move" or translate across the display, one can determine the minimum number of changes that must be made to cause a display to change the image that appears thereon.

As already explained, many displays which are bistable within the meaning of that term as defined above are not truly bistable over extended periods. For example, pixels which are supposed to remain dark gradually become lighter in color.

Thus, such displays might be said to be "bi-metastable" rather than truly bistable. Accordingly, when such displays are used for an extended period, it is desirable to apply at intervals a "blanking" signal to all the elements of the display in order to ensure that all the elements are driven to one of their two optical states. For example, in the display shown in FIGS. 4A and 4B, it is desirable at intervals to apply a blanking pulse to drive all the pixels to their white state. In the interest of using methods which sum to zero, it is desirable that the blanking signal be preceded by a pre-blanking signal, which in the case of the display shown in FIGS. 4A and 4B, would drive all the pixels to their dark state.

It will be appreciated that the "bi-metastability" of such displays normally affects both the display states. For example, in a display where one display state is white and the other is dark, the white state slowly becomes darker, while the dark state slowly becomes lighter. In practice, the gradual darkening of the white state tends to be more troublesome than the gradual lightening of the dark state, especially when the display is operated to show white characters on a dark background. As is well-known to (for example) manufacturers of paints, the human eye is highly sensitive to small differences in reflectivity (albedo) within areas which are supposed to be a uniform white color, but is considerably less sensitive to small changes in reflectivity and hue within dark colored areas. Also, observers tend to be more sensitive to variation in foreground colors (i.e., the colors of the letters they are reading) than to variations in background colors.

Suppose, for example, that the display shown in FIGS. 4A and 4B is operated to display white characters on a dark background, i.e., in the reverse manner to that described above. When the display is changed from a white "A" to a white "B" using the third method of the invention as described above, the first class of pixels (denoted by "X" in FIGS. 4A and 4B) stay white, the second class of pixels (denoted by "Y") change from white to dark, the third class of pixels (denoted by "Z") change from dark to white, and a fourth class of pixels (all those pixels not included in the first, second or third classes, and left blank in FIGS. 4A and 4B) stay dark. Thus, the letter "B" displayed is composed of two different types of pixels, namely the first class of pixels which have been white for some time, and the third class of pixels which have just been driven to their white state. If the white state is metastable, these first and third classes of pixels will differ in reflectivity, since the white state of the first class of pixels has had a chance to darken, whereas the white state of the third class is freshly written. Depending upon the rate at which the white state darkens, the difference in color between the first and third classes of pixels may be visible to the observer as an undesirable mottling within the letter "B". (While there is in principle a difference between the dark color of the newly-darkened second class of pixels and the dark color of the fourth class of pixels which have been dark for a longer time, for reasons already explained this difference is not usually noticeable and problems can be avoided by applying pre-blanking and blanking pulses at intervals.)

This potential mottling problem is avoided by the fourth process of the present invention. To carry out the change from a white "A" to a white "B" using this fourth process, both the first and second classes of pixels shown in FIG. 4A (i.e., the entire first subset of pixels forming the letter "A") are first driven dark, so that all the pixels of the display are dark. The first and third classes of pixels (i.e., the entire second subset of pixels forming the letter "B") are then driven white, thus achieving the state shown in FIG. 4B. Since all the white pixels forming the letter "B" have been driven white at the same time, they all display a uniform appearance. Furthermore, even if the "B" remains displayed for some time, so that the white state of the pixels forming this letter gradually darkens, such darkening will be uniform, and the eye is less sensitive to slight color changes throughout an area of the same color than to color differences between pixels within this area.

From the foregoing description, it will be seen that the fourth process of the invention does require more changes of color than the third process, in that the fourth process requires that the first class of pixels (which form part of both images) undergo a double transition, white-dark-white, during the process. However, the number of additional changes is relatively small, and thus the fourth process achieves most of the reduction in rate of deterioration of the display material achieved by the third process while also avoiding any mottling problem.

Figure 5:
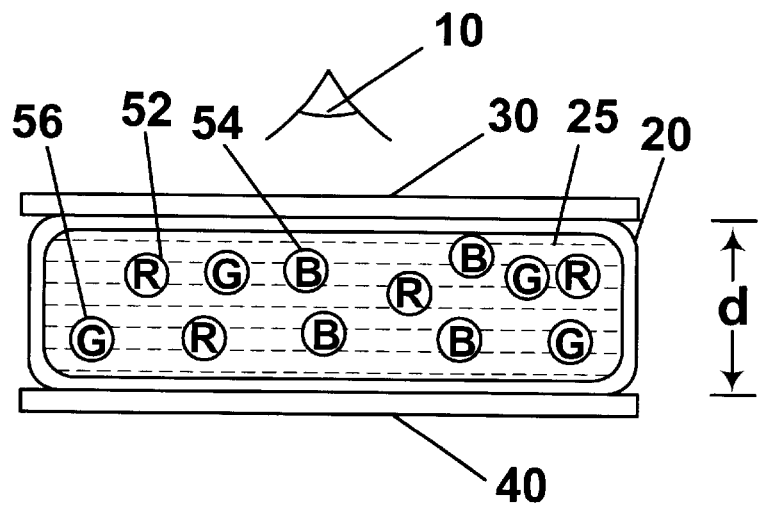
FIG. 5 is a diagrammatic side view of an embodiment of a color display element having red, green, and blue particles of different electrophoretic mobilities.

In another embodiment, depicted in FIG. 5, a color display is provided by a capsule 20 of size d containing multiple species of particles in a clear, dispersing fluid 25. Each species of particles has different optical properties and possess different electrophoretic mobilities ($\mu$) from the other species. In the embodiment depicted in FIG. 5, the capsule 20 contains red particles 52, blue particles 54, and green particles 56, and $$|\mu_R|>|\mu_B|>|\mu_G|$$

That is, the magnitude of the electrophoretic mobility of the red particles 52, on average, exceeds the electrophoretic mobility of the blue particles 54, on average, and the electrophoretic mobility of the blue particles 54, on average, exceeds the average electrophoretic mobility of the green particles 56. As an example, there may be a species of red particle with a zeta potential of 100 millivolts (mV), a blue particle with a zeta potential of 60 mV, and a green particle with a zeta potential of 20 mV. The capsule 20 is placed between two electrodes 30, 40 that apply an electric field to the capsule.

Figure 6A:
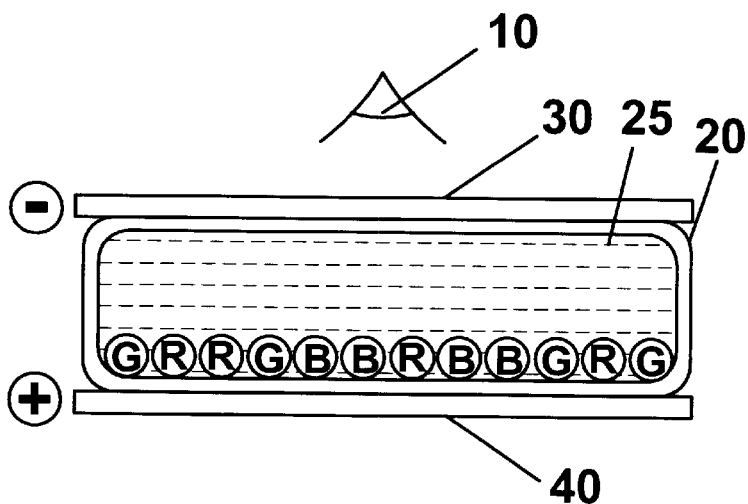
FIGS. 6A–6B depict the steps taken to address the display of FIG. 5 to display red.
Figure 6B:
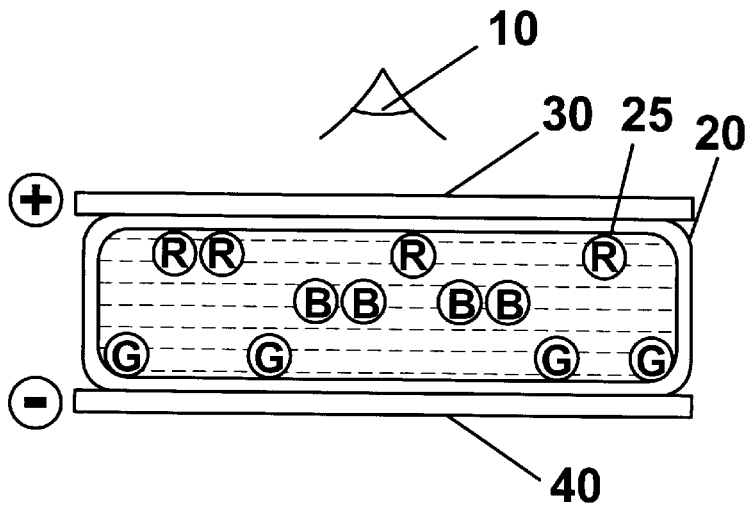

FIGS. 6A–6B depict the steps to be taken to address the display shown in FIG. 5 to display a red color to a viewpoint 10. Referring to FIG. 6A, all the particles 52, 54, 56 are attracted to one side of the capsule 20 by applying an electric field in one direction. The electric field should be applied to the capsule 20 long enough to attract even the more slowly moving green particles 56 to the electrode 40. Referring to FIG. 6B, the electric field is reversed just long enough to allow the red particles 52 to migrate towards the electrode 30. The blue particles 54 and green particles 56 will also move in the reversed electric field, but they will not move as fast as the red particles 52 and thus will be obscured by the red particles 52. The amount of time for which the applied electric field must be reversed can be determined from the relative electrophoretic mobilities of the particles, the strength of the applied electric field, and the size of the capsule.

Figure 7A:
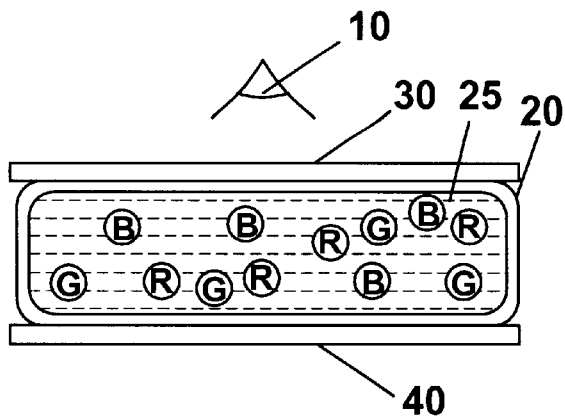
FIGS. 7A–7D depict the steps taken to address the display of FIG. 5 to display blue.
Figure 7B:
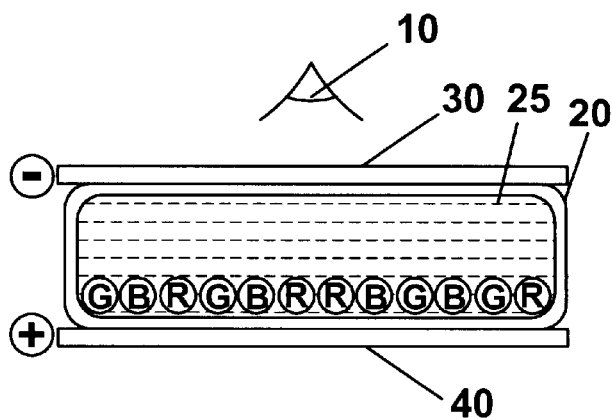
Figure 7C:
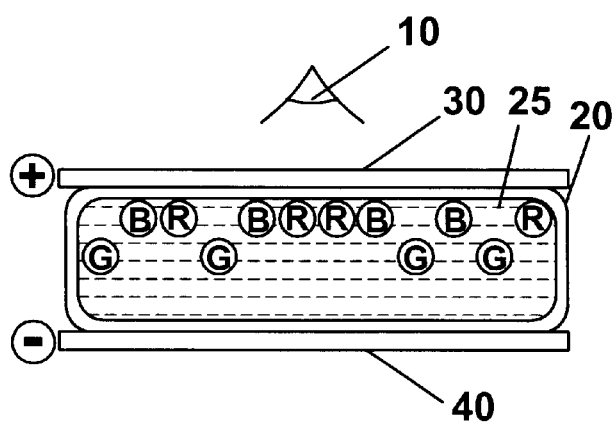
Figure 7D:
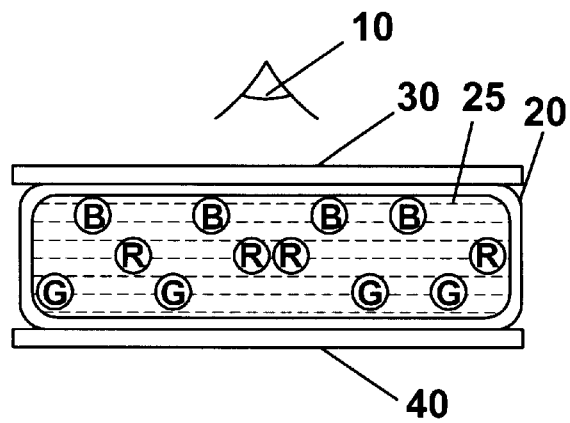

FIGS. 7A–7D depict addressing the display element to a blue state. As shown in FIG. 7A, the particles 52, 54, 56 are initially randomly dispersed in the capsule 20. All the particles 52, 54, 56 are attracted to one side of the capsule 20 by applying an electric field in one direction (shown in FIG. 7B). Referring to FIG. 7C, the electric field is reversed just long enough to allow the red particles 52 and blue particles 54 to migrate towards the electrode 30. The amount of time for which the applied electric field must be reversed can be determined from the relative electrophoretic mobilities of the particles, the strength of the applied electric field, and the size of the capsule. Referring to FIG. 7D, the electric field is then reversed a second time and the red particles 52, moving faster than the blue particles 54, leave the blue particles 54 exposed to the viewpoint 10. The amount of time for which the applied electric field must be reversed can be determined from the relative electrophoretic mobilities of the particles, the strength of the applied electric field, and the size of the capsule.

Figure 8A:
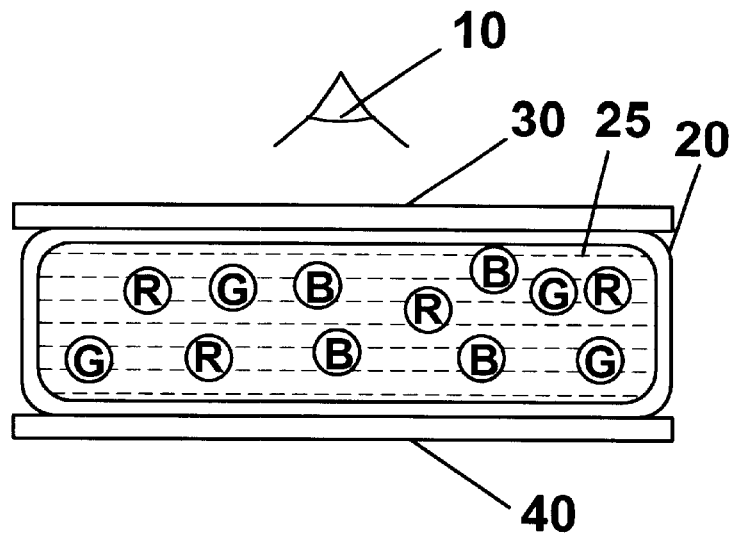
FIGS. 8A–8C depict the steps taken to address the display of FIG. 5 to display green.
Figure 8B:
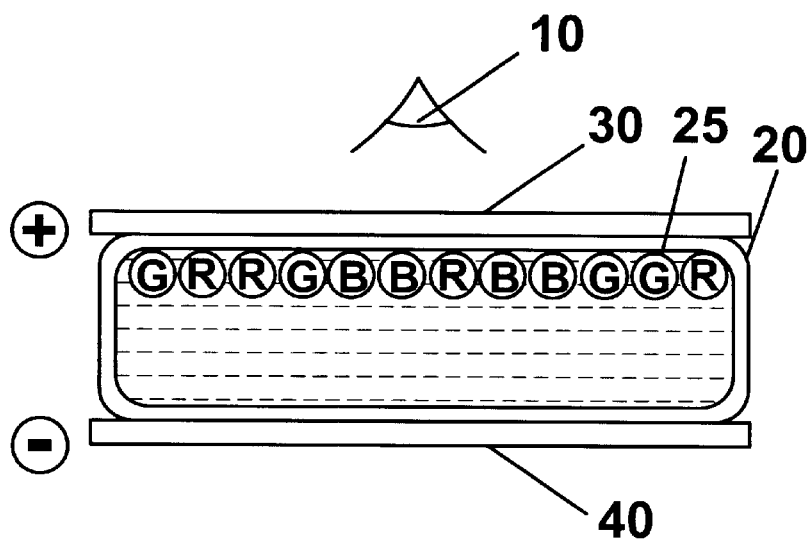
Figure 8C:
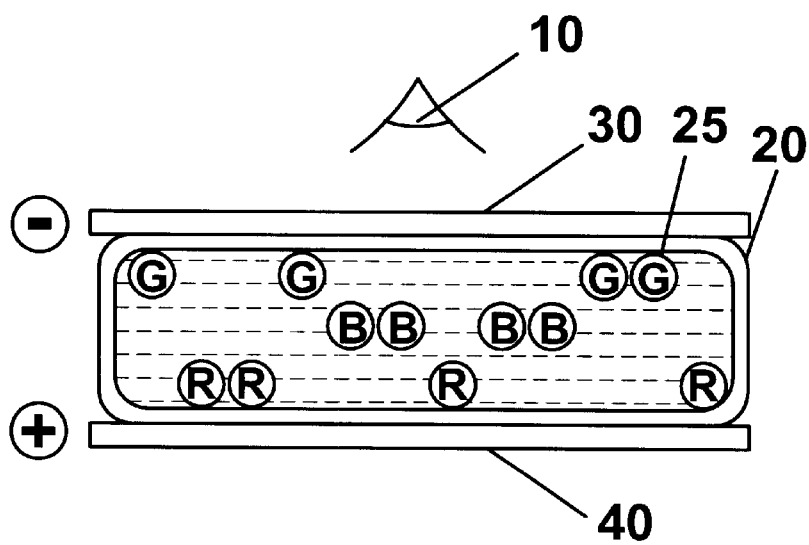

FIGS. 8A–8C depict the steps to be taken to present a green display to the viewpoint 10. As shown in FIG. 8A, the particles 52, 54, 56 are initially distributed randomly in the capsule 20. All the particles 52, 54, 56 are attracted to the side of the capsule 20 proximal the viewpoint 10 by applying an electric field in one direction. The electric field should be applied to the capsule 20 long enough to attract even the more slowly moving green particles 56 to the electrode 30. As shown in FIG. 8C, the electric field is reversed just long enough to allow the red particles 52 and the blue particles 54 to migrate towards the electrode 54, leaving the slowly-moving green particles 56 displayed to the viewpoint. The amount of time for which the applied electric field must be reversed can be determined from the relative electrophoretic mobilities of the particles, the strength of the applied electric field, and the size of the capsule.

In other embodiments, the capsule contains multiple species of particles and a dyed dispersing fluid that acts as one of the colors. In still other embodiments, more than three species of particles may be provided having additional colors. Although FIGS. 5–8C depict two electrodes associated with a single capsule, the electrodes may address multiple capsules or less than a full capsule.

In order to address the capsule 20 to display red, green or blue as described above, at least one application of an addressing signal that creates an electric field is required. In some instances, more than one addressing signal may be needed to address capsule 20 to display a desired color. As was described with regard to the addressing of a two color (i.e., black and white) display element, one can compute the integral of the amplitude as a function of time integrated over the duration of application of an addressing signal for each signal that must be applied. The polarity of the applied signal must also be taken into account in the computation. To the extent that multiple addressing signals of the same polarity are applied, their integrals will be added. To the extent that addressing signals of opposite polarities are used, the integrals of the addressing signals of the same polarity will be added, and the integrals of addressing signals of the opposite polarity will be subtracted from the first sum. Thus, one can compute a net value of the residual value in volt-seconds of all of the signals needed to address a display element. One can then determine for a pre- or post-addressing signal the polarity, the magnitude as a function of time, and the duration required to pre- or post-address the capsule, such that the net average field including the pre- or post-addressing signal and all of the components of the addressing signal will be zero. One can then apply such a pre- or post-addressing signal prior to or subsequent to the application of the sequence of addressing signals needed to address the capsule 20 to bring about a display state of the desired color, with the feature that the time average net field applied to the capsule will be zero.

When the second method of the present invention, which requires the use of a post-addressing signal, is used with the display illustrated in FIGS. 5–8C, it should be noted that, provided the post-addressing signal does not affect the particles adjacent the viewing surface of the display, it does not matter that particles elsewhere in the display element move. For example, suppose that the second method of the invention requires application of a low-amplitude post-addressing signal to the display shown in FIG. 8C, this signal requiring application of a positive potential to the rear electrode 40 and a negative potential to the front electrode 30. Provided that this post-addressing signal is kept below the threshold of the green particles, so that the green particles remain adjacent the viewing surface, it is irrelevant that the post-addressing signal causes the blue particles to move from their central positions shown in FIG. 8C to positions adjacent the rear electrode 40 and intermingled with the red particles, since such movement of the blue particles causes no visible difference in the state of the display.

Figure 9A:
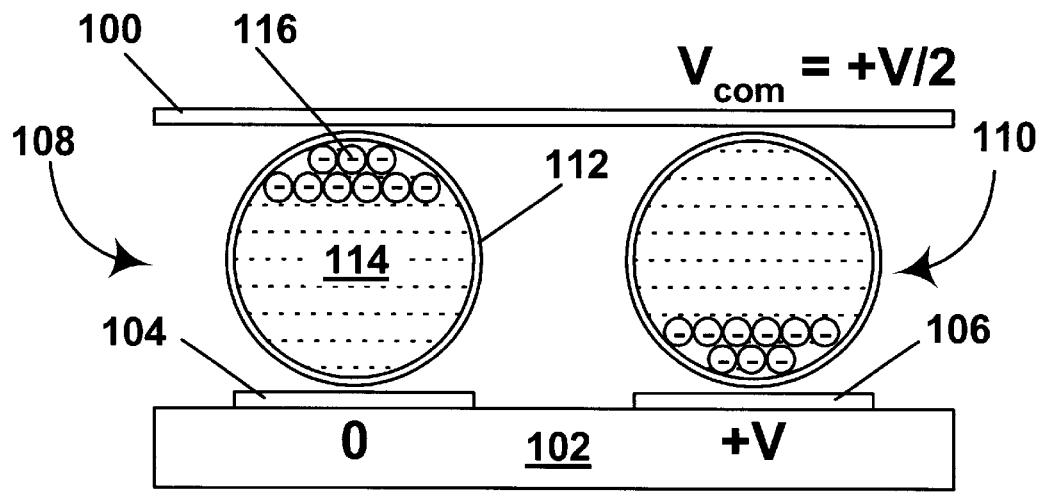
FIGS. 9A and 9B illustrate two different arrangements for addressing an electrophoretic display.
Figure 9B:
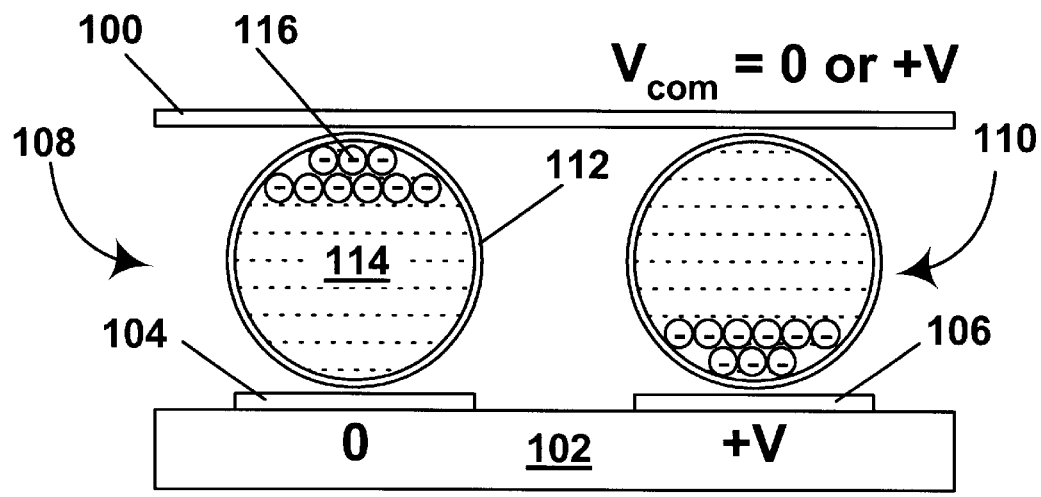

FIGS. 9A and 9B illustrate schematically two different arrangements for addressing an encapsulated electrophoretic display using an active matrix liquid crystal display backplane or similar structure. In both these arrangements, the display is provided, on its front or viewing surface (top surface as illustrated in FIGS. 9A and 9B) with a common, transparent front electrode 100, and on its rear surface with a substrate 102 carrying a matrix of discrete electrodes (only two of these electrodes, designated 104 and 106 respectively are shown in FIGS. 9A and 9B). Each of the discrete electrodes 104 and 106 defines a pixel of the display. An encapsulated electrophoretic medium (generally designated 108) is disposed between the common electrode 100 and the discrete electrodes 104 and 106; for ease of illustration, FIGS. 9A and 9B show only a single capsule 110 of the medium 108 associated with each discrete electrode 104 and 106, although in practice a plurality of capsules (typically at least 20) would be associated with each discrete electrode. Also for ease of illustration, the capsules are shown in FIGS. 9A and 9B as of circular cross-section, although in practice it is preferred that they have the flattened form shown in, for example, FIG. 1A.

Each of the capsules 110 comprises a capsule wall 112, a dark colored fluid 114 contained within this capsule wall 112 and a plurality of light colored charged particles 116 suspended in the fluid 114; the particles 116 may for example be formed of titania. For purposes of illustration, it is assumed that the particles 116 are negatively charged so that they will be drawn to whichever of their associated discrete electrode and the common electrode is at the higher potential. However, the particles 116 could alternatively be positively charged. Also, the particles could be dark in color and the fluid 114 light in color so long as sufficient color contrast occurs as the particles move between the front and rear surfaces of the display medium, as shown in FIGS. 9A and 9B. The medium 110 could also be of the type previously described which contains two different types of particles having different optical properties and different electrophoretic mobilities.

Although the electrode structures shown in FIGS. 9A and 9B are essentially identical to those of conventional active matrix liquid crystal displays, the voltages which need to be applied to these electrodes are very different. Conventional liquid crystal display materials require continuous driving with an alternating electric field if a given pixel is to be maintained in a transmissive state. If a given pixel is to be non-transmissive, no field is applied so that the liquid crystal molecules can revert to random orientations. Accordingly, in conventional liquid crystal displays the common electrode is normally held at half the maximum pixel voltage (conventionally denoted "+V/2"), while the discrete electrodes are either cycled rapidly between 0 and +V (when the associated pixels are to be transmissive) or not driven at all (when the associated pixels are to be non-transmissive). Electrophoretic displays, on the other hand, require addressing with a field which remains in one direction for a time sufficient to permit the particles 116 to move between the two positions shown in FIG. 9A; the field must be capable of being applied in either direction, depending upon the direction in which it is desired to move the particles, but after the field has been applied for the time necessary to move the particles from one of the positions shown in FIG. 9A to the other, the field can be removed since the electrophoretic medium is essentially bistable.

FIGS. 9A and 9B illustrate two different arrangements for achieving the necessary reversible fields. In FIG. 9A, the common electrode is held at half the maximum pixel voltage (+V/2), while the discrete electrodes 104 and 106 can be set to either 0 or +V. To drive a specific pixel dark, its associated discrete electrode is set to +V; to drive a pixel white, its associated discrete electrode is set to 0. The resulting voltages across the electrophoretic display medium are 0 or V/2. In FIG. 9B, on the other hand, both the common electrode and each of the discrete electrodes can be set to 0 or +V. The resulting voltages across the electrophoretic display medium are 0 or V.

Figure 10:
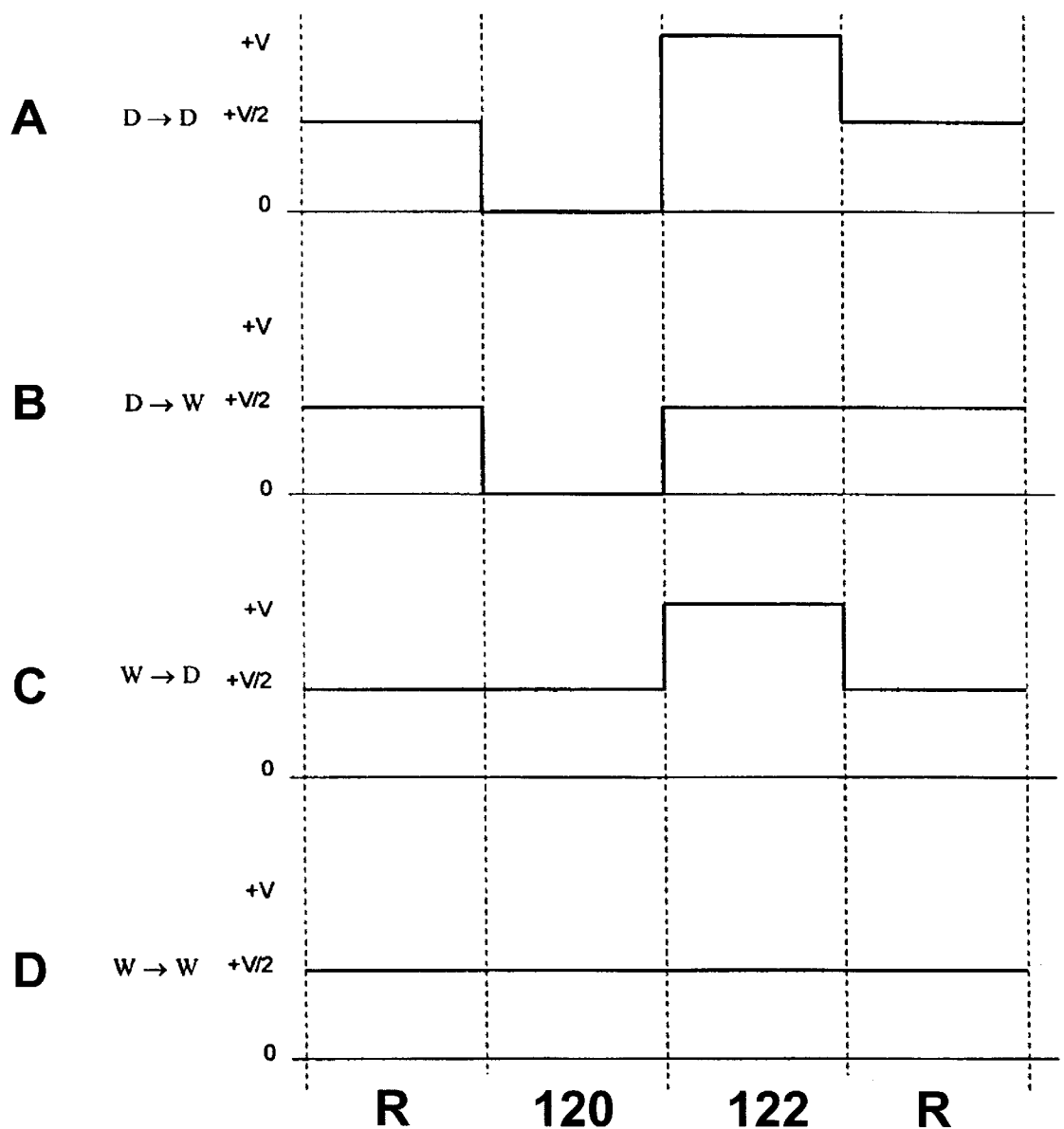
FIGS. 10 and 11 illustrate two drive waveforms which can be used with the addressing arrangement shown in FIG. 9A.

FIG. 10 illustrates a especially preferred drive scheme using the arrangement shown in FIG. 9A. This drive scheme, which is an example of both the fourth and fifth methods of the present invention, comprises two essential sub-cycles. However, since an electrophoretic display is bistable and is not normally driven continuously, in FIG. 10 these two essential sub-cycles are illustrated flanked by two resting sub-cycles, designated "R", in which the display is not being driven, and all the discrete electrodes are set to +V/2, the same voltage as the common electrode, so that there is no field across any part of the electrophoretic medium 108 (FIG. 9A). FIG. 10 assumes that dark characters are being written on a light background, and thus the drive schemes shown in FIG. 10 has as its first sub-cycle a "white clearing frame" (designated 120), in which all the pixels of the display are set to white, thus allowing for uniform image updating, as previously described. This white clearing frame 120 is followed by the addressing frame, designated 122.

More specifically, as already described, the pixels of the display can be divided into four classes. The first class comprises those pixels which form part of both the initial and the final image displayed, and hence are dark at both the beginning and the end of the transition illustrated in FIG. 10. The wave form applied to the discrete electrodes associated with this first class of pixels is denoted "A" in FIG. 10. As will be seen from FIG. 10, the discrete electrodes associated with this first class are set to 0 during the white clearing frame 120 (thus driving the first class of pixels white), and are then set to +V during the addressing frame 122 (thus driving the first class of pixels back to their dark state). The second class comprises those pixels which form part of the initial image but not part of the final image, and hence are dark at the beginning of the transition illustrated in FIG. 10 but white at the end of this transition. The wave form applied to the discrete electrodes associated with this second class of pixels is denoted "B" in FIG. 10. The discrete electrodes associated with the second class are set to 0 during the white clearing frame 120 (thus driving the second class of pixels white), and are then set to +V/2 during the addressing frame 122 (thus maintaining the second class of pixels in their white state). The third class comprises those pixels which do not form part of the initial image but do form part of the final image, and hence are white and the beginning of the transition illustrated in FIG. 10 but dark at the end of this transition. The wave form applied to the discrete electrodes associated with this third class of pixels is denoted "C" in FIG. 10. The discrete electrodes associated with the third class are set to +V/2 during the white clearing frame 120 (thus maintaining the third class of pixels in their initial white state), and are then set to +V during the addressing frame 122 (thus driving the third class of pixels dark). Finally, the third class comprises those pixels which do not form part of either the initial or the final image, and hence are white and the beginning and end of the transition illustrated in FIG. 10. As denoted by "D" in FIG. 10, the discrete electrodes associated with the fourth class are set to +V/2 during both the white clearing frame 120 and the addressing frame 122, so that no field is applied to these pixels during either frame and they maintain their initial white states.

The drive scheme shown in FIG. 10 requires that the controller used to able to supply three voltage levels, namely 0, +V/2 and +V. Furthermore, this drive scheme is DC-balanced in the sense that the time integral of the applied field is zero for any pixel during a period which starts and ends in the same white or dark display state; note that a pixel which undergoes a dark-white-dark or white-dark-white transition, and is thus exposed to wave forms B and C in FIG. 10 in either order has no net average field applied. Furthermore, since the drive scheme shown in FIG. 10 does not apply any field to the fourth class of pixels, which will typically be the most numerous in any alphanumeric display, the drive scheme keeps the number of pixel transitions, and hence the periods during which the electrodes are exposed to substantial fields, close to a minimum. The drive scheme typically requires that data for the final image be loaded at the beginning of the addressing frame 122.

Figure 11:
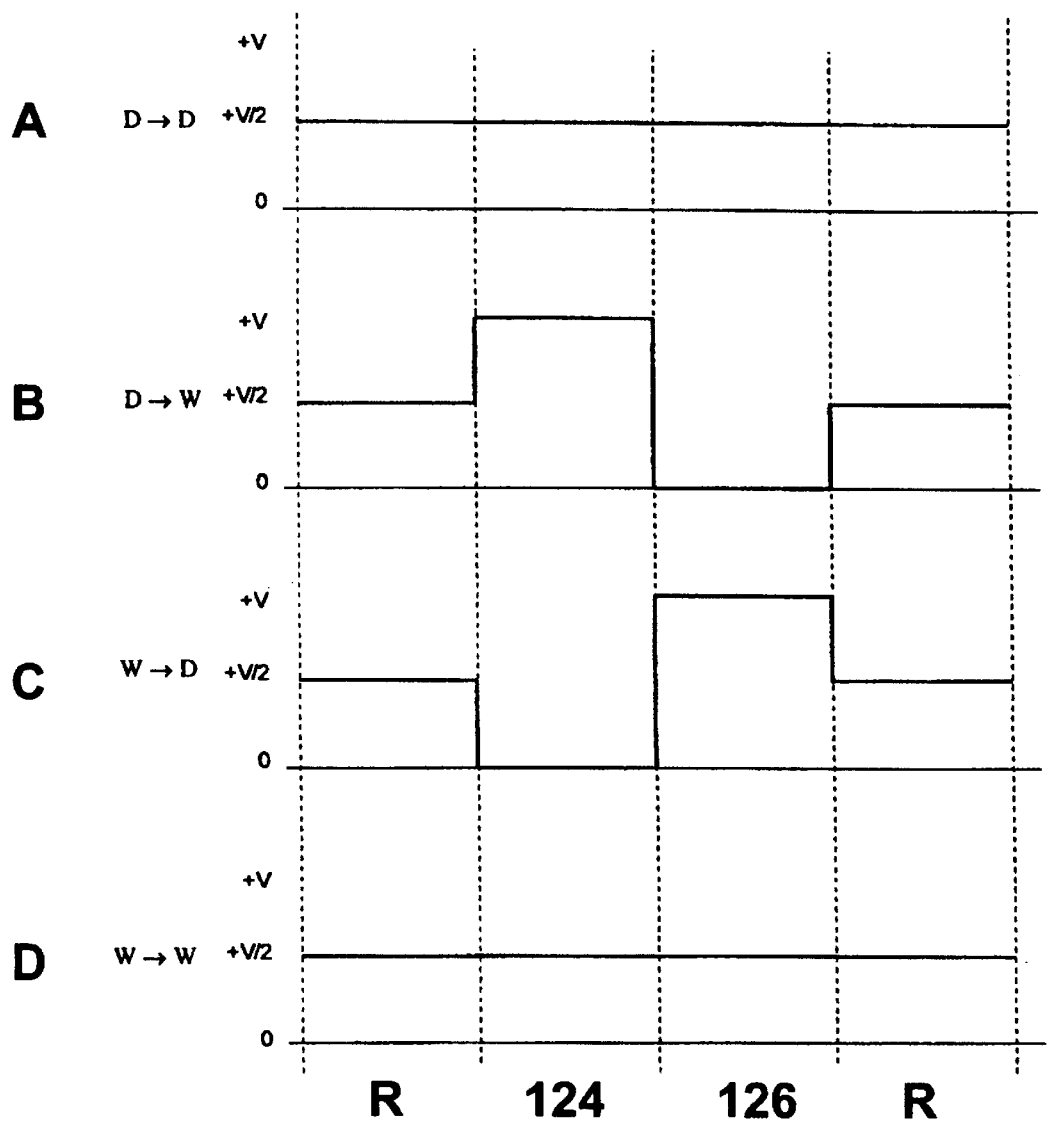

FIG. 11 shows a somewhat less preferred, but still useful, drive scheme which may be substituted for that shown in FIG. 10, again with the common electrode held at +V/2 throughout the drive scheme. In addition to the two resting sub-cycles R, the drive scheme shown in FIG. 11 comprises a balance frame 124 and an addressing frame 126. As shown in FIG. 11, the discrete electrodes associated with the first and fourth classes of pixels (wave forms A and D) are held at the same voltage as the common electrode throughout the drive scheme, so that no re-writing occurs of any pixel which does not need to change color during the transition shown in FIG. 11, thus keeping the number of pixel transitions to the absolute minimum, in accordance with the third process of the present invention.

As in the drive scheme shown in FIG. 10, in the drive scheme shown in FIG. 11 the third class of pixels (wave form C) are changed from white to dark by setting the associated discrete electrodes to +V during the addressing frame 126. Similarly, the second class of pixels (wave form B) are changed from dark to white by setting the associated discrete electrodes to 0; however, in the drive scheme shown in FIG. 11, this change of the second class of pixels from dark to white is effected during the addressing frame 126, rather than during a white clearing frame, as in the drive scheme shown in FIG. 10. Thus, in the drive scheme shown in FIG. 11 the white-to-dark and dark-to-white transitions occur simultaneously, rather than sequentially as in the drive scheme shown in FIG. 10. The balance frame 124 is used to provide pre-addressing pulses to the second and third classes of pixels, in accordance with the first method of the present invention; as shown in FIG. 11, during the balance frame 124 the discrete electrodes associated with the second class of pixels are set to +V, while the discrete electrodes associated with the third class of pixels are set to 0. Thus, the drive. scheme shown in FIG. 11 ensures that the time average of the electric field applied to any pixel during any transition is zero. The drive scheme shown in FIG. 11 is especially suitable for applications involving fast frame rates.

It will be appreciated that the drive schemes shown in FIGS. 10 and 11 can be modified to include pre-blanking and blanking signals as already described. When these drive schemes are used to write dark alphanumeric characters on a white background, the pre-blanking signal will write all pixels dark, while the blanking signal will write all pixels white. Accordingly, in both the drive schemes shown in FIGS. 10 and 11, pre-blanking is effected by setting all the discrete electrodes to +V, while blanking is effected by setting all the discrete electrodes to 0.

Figure 12:
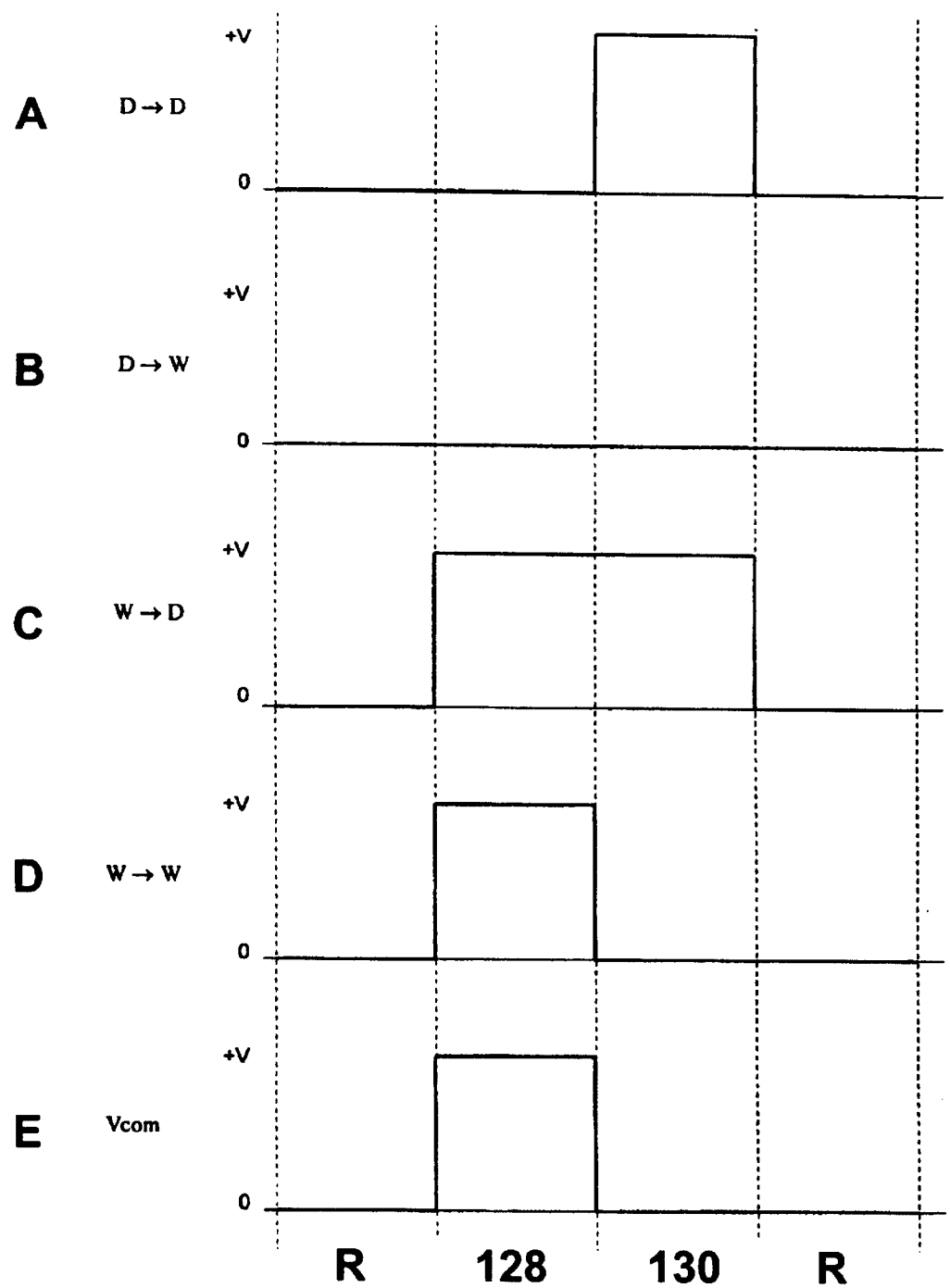
FIGS. 12 and 13 illustrate two drive waveforms which can be used with the addressing arrangement shown in FIG. 9B.

FIG. 12 shows a third drive scheme which is similar to the first drive scheme shown in FIG. 10 in that it comprises, in sequence, a resting sub-cycle R, a white clearing frame 128, an addressing frame 130 and a second resting sub-cycle R. However, this third drive scheme differs from the first in that it uses the arrangement shown in FIG. 9B, in which the common electrode can be toggled between 0 and +V, while each of the discrete electrodes can also be set to 0 or +V. Thus, this third drive scheme requires that the controller only be able to supply voltages of 0 and +V, and also allows twice as high a drive voltage across the electrophoretic medium as compared with the first drive scheme shown in FIG. 10.

As indicated by wave form E in FIG. 12, the common electrode is maintained at 0 during the resting sub-cycles R and during the addressing frame 130, but is toggled to +V during the white clearing frame 128. Apart from the differences in the voltages which can be applied to the common and discrete electrodes, the wave forms A–D in FIG. 12 are directly comparable to those shown in FIG. 10. Thus, all the discrete electrodes are kept at the same voltage (0) as the common electrode during the two resting sub-cycles R. The discrete electrodes associated with the first class of pixels (wave form A) are kept at a voltage (0) lower than that of the common electrode during the white clearing frame 128, but at a voltage (+V) higher than that of the common electrode during the addressing frame 130. The discrete electrodes associated with the second class of pixels (wave form B) are kept at a voltage (0) lower than that of the common electrode during the white clearing frame 128, and at the same voltage as the common electrode during the addressing frame 130; thus, the discrete electrodes associated with the second class of pixels are kept at 0 throughout. The discrete electrodes associated with the third class of pixels (wave form C) are kept at the same voltage (+V) as the common electrode during the white clearing frame 128 but at a voltage (again +V) higher than that of the common electrode during the addressing frame. 130. Finally, the discrete electrodes associated with the fourth class of pixels (wave form D) are simply kept at the same voltage as the common electrode throughout.

The third drive scheme shown in FIG. 12 is not recommended for applications such as video displays which require high frame rates but is very suitable for applications such as electronic books which only require relatively slow updating.

Figure 13:
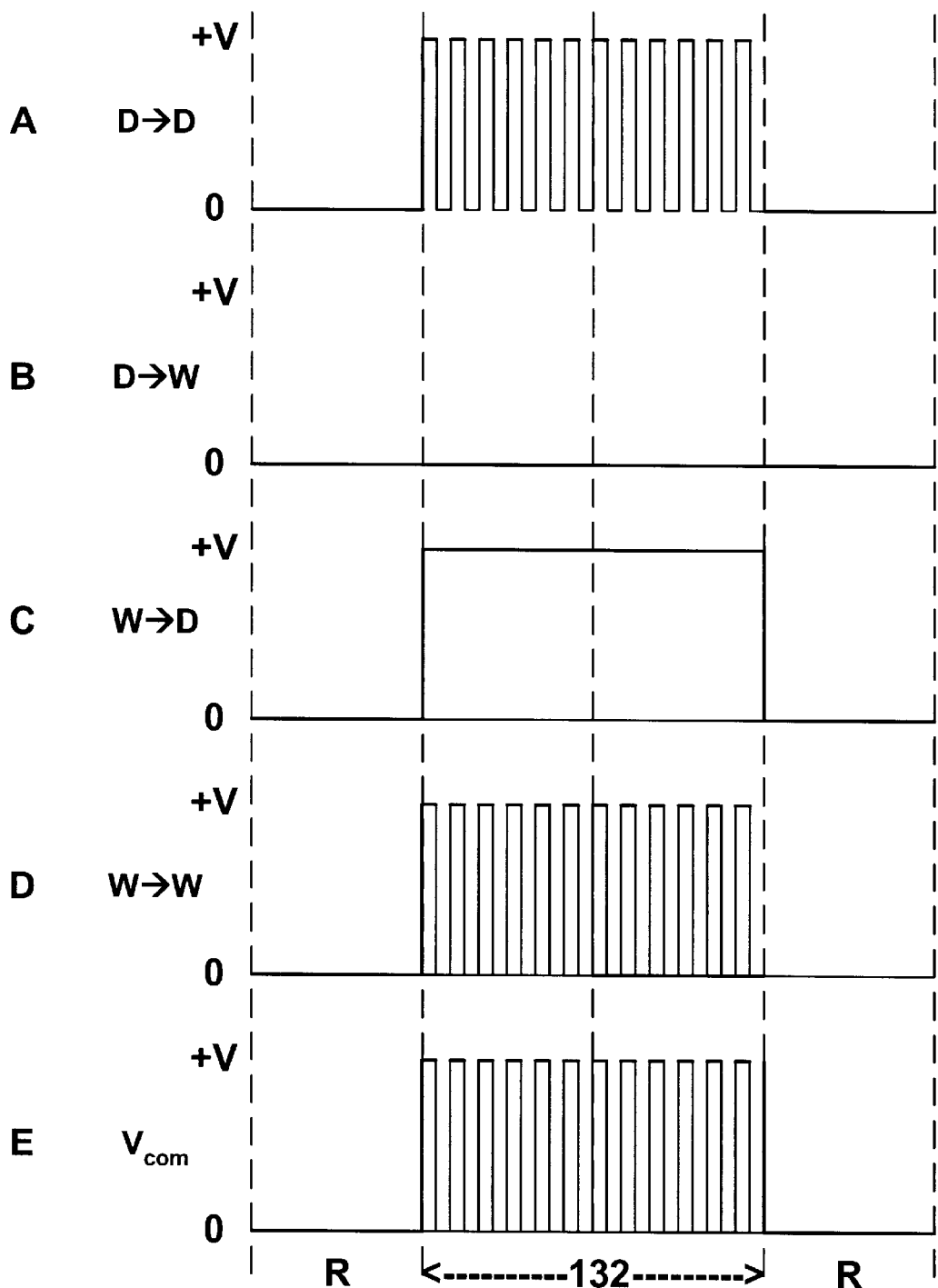

FIG. 13 shows a fourth drive scheme in which the common electrode (wave form E) is repeatedly toggled between 0 and +V, so that the addressing frame (designated 132) consists of a plurality of sub-cycles, each of these sub-cycles comprising a short period during which the common electrode is held at +V, followed by a period of equal duration during which the common electrode is held at 0. As in the drive schemes previously discussed, the addressing frame 132 is preceded and followed by two resting sub-cycles R in which both the common electrode and all the discrete electrodes are set to 0.

The fourth drive scheme shown in FIG. 13 resembles the second drive scheme shown in FIG. 11 in that the voltage is applied to the discrete electrodes associated with the first and fourth classes of pixels (wave forms A and D respectively) is kept throughout the same as the voltage applied to the common electrode, so that the first and fourth classes of pixels experience no field at any time (and thus the fourth drive scheme carries out the third method of the present invention). The discrete electrodes associated with the second class of pixels (wave form B) are held at 0 throughout the addressing frame 132, while the discrete electrodes associated with the third class of pixels (wave form C) are held at +V throughout the addressing frame 132.

The fourth drive scheme will appear to an observer to effect dark-to-white and a white-to-dark transitions simultaneously. The fourth drive scheme may be modified, in a manner similar to the second drive scheme already discussed, to include a balancing frame which ensures that the time average field applied to any electrode during the complete transition is zero.

Figure 14:
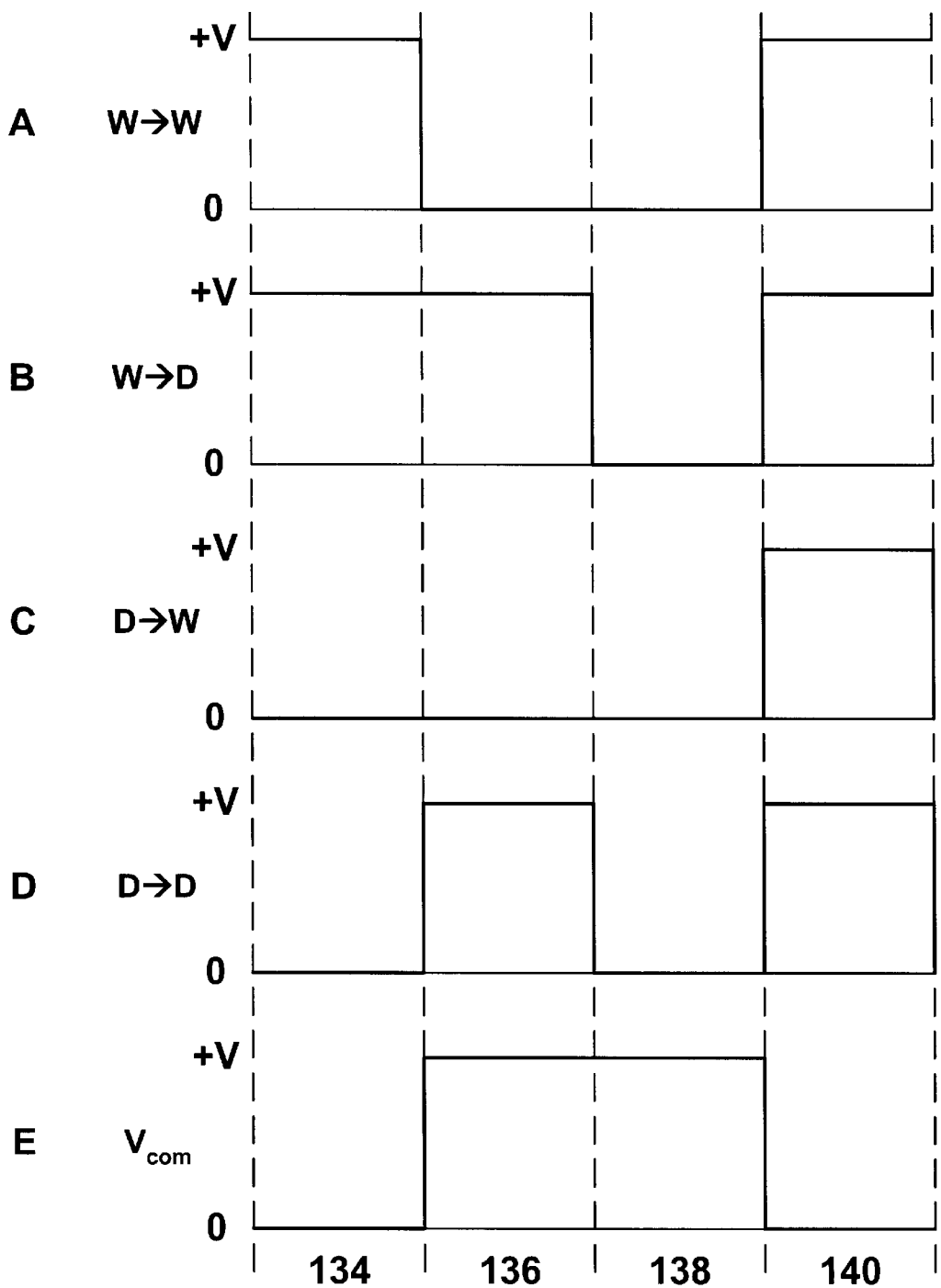
FIG. 14 illustrates a third drive waveform which can be used with the addressing arrangement shown in FIG. 9B, this third drive waveform including blanking and pre-blanking signals.

FIG. 14 shows a fifth drive scheme which, like the third and fourth drive schemes already discussed, uses a common electrode which is toggled between 0 and +V. This fifth drive scheme is preferred for writing white alphanumeric characters on a dark background using the fourth method of the present invention.

FIG. 14, unlike FIGS. 10–13, illustrates the fifth drive scheme without resting sub-cycles but with pre-blanking and blanking signals; it should of course be understood that these pre-blanking and blanking signals are only applied at spaced intervals depending upon the meta-bistability of the electrophoretic display, and that a plurality of addressing frames (described below) intervene between successive applications of the pre-blanking and blanking signals.

The fifth drive scheme begins with a dark clearing frame 134, in which the common electrode (wave form E) is set to +V. In this dark clearing frame 134, the discrete electrodes associated with the first and second classes of pixels (wave forms A and B respectively) are set to +V, thus driving these pixels dark, while the discrete electrodes associated with the third and fourth classes of pixels (wave forms C and D respectively) are kept at the same voltage (0) as the common electrode, so that these pixels remain dark. Thus, at the end of the dark clearing frame 134 all pixels are dark. The next frame of the fifth drive scheme is an addressing frame 136, in which the common electrode is set to +V, while the discrete electrodes associated with the first and third classes of pixels are set to 0, thus driving the first and third classes of pixels white. The discrete electrodes associated with the second and fourth classes of pixels are set to +V during the addressing frame 136, so that the second and fourth classes of pixels remain dark.

The next frame of the fifth drive scheme, as shown in FIG. 14, is a pre-blanking frame 138, in which the common electrode is set to +V and all the discrete electrodes are set to 0, so that all pixels are driven white. The pre-blanking frame is followed by a blanking frame 140, in which the common electrode is set to 0 and all the discrete electrodes are set to +V, thus driving all pixels dark. After this blanking frame, the regular sequence of dark clearing frames 134 and addressing frames 136 resumes, although obviously the dark clearing frame 134 immediately following a blanking frame 140 can be omitted if desired since all the pixels are already dark at the conclusion of the blanking frame.

As already mentioned, the drive schemes discussed above can be implemented by modifying a conventional active matrix liquid crystal display backplane and front electrode. In view of the differences discussed above between driving conventional liquid crystal displays and driving electrophoretic displays, the controller for the display needs to be modified to provide the reversible electric fields needed by electrophoretic displays; thus, it is necessary to modify the pixel value/pixel voltage mapping of the controller as set out in Table 1 below. For those drive schemes which require toggling of the voltage applied to the common electrode, additional software control is required to effect such toggling, which is conveniently effected via a control register; however, to avoid such modification it is generally preferred to use a drive scheme, such as the first or second scheme described above, which used the same three voltages (namely 0, +V/2 and +V) as a conventional liquid crystal display. The controller hardware also needs to be modified so that frame and column inversion driving is effectively shut off. This may readily be accomplished by providing the same polarity reference voltages to the driver chip.

Once the pixel value/pixel voltage mapping has been modified in the manner set out in Table 1, the image on the electrophoretic display can rapidly been modified simply by writing different digital images to the video RAM of the controller.

| | LCD Pixel Voltage | | Electrophoretic Pixel Voltage | |
|---|---|---|---|---|
| | Positive | Negative | | |
| Pixel value | frame | frame | $V_{com} = +V/2$ | $V_{com} = 0$ or $+V$ |
| 0 | +V/2 | +V/2 | 0 (white) | 0 (white, not driven) |
| 127, 128 | +3V/4 | +V/4 | +V/2 (not driven) | not used |
| 255 | +V | 0 | +V (dark) | +V (dark, not driven) |

It will be appreciated that the various wave forms described above do not include any gate pulse timing diagrams, as there is little love to control decides the scan frequency. The display may, for example, operate at a frame rate of 60–75 Hz and with gate pulse widths in the range of 17–22 μs. For obvious reasons, the highest frame rate possible is preferred.

In an encapsulated electrophoretic image display, an electrophoretic suspension, such as the ones described previously, is placed inside discrete compartments that are dispersed in a polymer matrix. This resulting material is highly susceptible to an electric field across the thickness of the film. Such a field is normally applied using electrodes attached to either side of the material. However, some display media may be addressed by writing electrostatic charge onto one side of the display material. The other side normally has a clear or opaque electrode. For example, a sheet of encapsulated electrophoretic display media can be addressed with a head providing DC voltages.

In another implementation, the encapsulated electrophoretic suspension can be printed onto an area of a conductive material such as a printed silver or graphite ink, aluminized Mylar, or any other conductive surface. This surface which constitutes one electrode of the display can be set at ground or high voltage. An electrostatic head consisting of many electrodes can be passed over the capsules to address them. Alternatively, a stylus can be used to address the encapsulated electrophoretic suspension.

In another implementation, an electrostatic write head is passed over the surface of the material. This allows very high resolution addressing. Since encapsulated electrophoretic material can be placed on plastic, it is flexible. This allows the material to be passed through normal paper handling equipment. Such a system works much like a photocopier, but with no consumables. The sheet of display material passes through the machine and an electrostatic or electrophotographic head addresses the sheet of material.

In another implementation, electrical charge is built up on the surface of the encapsulated display material or on a dielectric sheet through frictional or triboelectric charging. The charge can built up using an electrode that is later removed. In another implementation, charge is built up on the surface of the encapsulated display by using a sheet of piezoelectric material.

Microencapsulated displays offer a useful means of creating electronic displays, many of which can be coated or printed. There are many versions of microencapsulated displays, including microencapsulated electrophoretic displays. These displays can be made to be highly reflective, bistable, and low power.

To obtain high resolution displays, it is useful to use some external addressing means with the microencapsulated material. This invention describes useful combinations of addressing means with microencapsulated electrophoretic materials in order to obtain high resolution displays.

One method of addressing liquid crystal displays is the use of silicon-based thin film transistors to form an addressing backplane for the liquid crystal. For liquid crystal displays, these thin film transistors are typically deposited on glass, and are typically made from amorphous silicon or polysilicon. Other electronic circuits (such as drive electronics or logic) are sometimes integrated into the periphery of the display. An emerging field is the deposition of amorphous or polysilicon devices onto flexible substrates such as metal foils or plastic films.

The addressing electronic backplane could incorporate diodes as the nonlinear element, rather than transistors. Diode-based active matrix arrays have been demonstrated as being compatible with liquid crystal displays to form high resolution devices.

There are also examples of crystalline silicon transistors being used on glass substrates. Crystalline silicon possesses very high mobilities, and thus can be used to make high performance devices. Presently, the most straightforward way of constructing crystalline silicon devices is on a silicon wafer. For use in many types of liquid crystal displays, the crystalline silicon circuit is constructed on a silicon wafer, and then transferred to a glass substrate by a "liftoff" process. Alternatively, the silicon transistors can be formed on a silicon wafer, removed via a liftoff process, and then deposited on a flexible substrate such as plastic, metal foil, or paper. As another implementation, the silicon could be formed on a different substrate that is able to tolerate high temperatures (such as glass or metal foils), lifted off, and transferred to a flexible substrate. As yet another implementation, the silicon transistors are formed on a silicon wafer, which is then used in whole or in part as one of the substrates for the display.

The use of silicon-based circuits with liquid crystals is the basis of a large industry. Nevertheless, these display possess serious drawbacks. Liquid crystal displays are inefficient with light, so that most liquid crystal displays require some sort of backlighting. Reflective liquid crystal displays can be constructed, but are typically very dim, due to the presence of polarizers. Most liquid crystal devices require precise spacing of the cell gap, so that they are not very compatible with flexible substrates. Most liquid crystal displays require a "rubbing" process to align the liquid crystals, which is both difficult to control and has the potential for damaging the TFT array.

The combination of these thin film transistors with microencapsulated electrophoretic displays should be even more advantageous than with liquid crystal displays. Thin film transistor arrays similar to those used with liquid crystals could also be used with the microencapsulated display medium. As noted above, liquid crystal arrays typically requires a "rubbing" process to align the liquid crystals, which can cause either mechanical or static electrical damage to the transistor array. No such rubbing is needed for microencapsulated displays, improving yields and simplifying the construction process.

Microencapsulated electrophoretic displays can be highly reflective. This provides an advantage in high-resolution displays, as a backlight is not required for good visibility. Also, a high-resolution display can be built on opaque substrates, which opens up a range of new materials for the deposition of thin film transistor arrays.

Moreover, the encapsulated electrophoretic display is highly compatible with flexible substrates. This enables high-resolution TFT displays in which the transistors are deposited on flexible substrates like flexible glass, plastics, or metal foils. The flexible substrate used with any type of thin film transistor or other nonlinear element need not be a single sheet of glass, plastic, metal foil, though. Instead, it could be constructed of paper. Alternatively, it could be constructed of a woven material. Alternatively, it could be a composite or layered combination of these materials.

As in liquid crystal displays, external logic or drive circuitry can be built on the same substrate as the thin film transistor switches.

In another implementation, the addressing electronic backplane could incorporate diodes as the nonlinear element, rather than transistors.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method for addressing a bistable display element having first and second display states differing in at least one optical property, the method comprising:
    (a) applying to the display element a first addressing signal effective to change the display state of the display element; and
    (b) thereafter applying to the display element a second addressing signal which does not change the display state of the display element
    the algebraic sum of the integral of the first addressing signal with respect to time and the integral of the second addressing signal with respect to time having an absolute value less than about 1 Volt-second.

2. A method according to claim 1 wherein the display element is an electrophoretic display element.

3. A method according to claim 2 wherein the display element is an encapsulated electrophoretic display element.

4. A method according to claim 2 wherein the display element comprises an electrophoretic medium comprising a liquid and at least one particle disposed within the liquid and capable of moving therethrough on application of an electric field to the medium.

5. A method according to claim 4 wherein the display element has a viewing surface and the liquid has a optical property differing from that of the at least one particle, the display element being in its first display state when the at least one particle lies adjacent its viewing surface and being in its second display state when the at least one particle is spaced from its viewing surface so that the liquid lies adjacent the viewing surface.

6. A method according to claim 4 wherein the display element has a viewing surface and the liquid has disposed therein at least one first particle having a first optical property and a first electrophoretic mobility and at least one second particle having a second optical property different from the first optical property and a second electrophoretic mobility different from the first electrophoretic mobility, the display element being in its first display state when the at least one first particle lies adjacent its viewing surface and being in its second display state when the at least one second particle lies adjacent its viewing surface.

7. A method according to claim 1 wherein the absolute value of the algebraic sum is less than about 0.1 Volt-second.

8. A method according to claim 1 wherein the first and second addressing signals are of opposite polarity.

9. A method according to claim 1 wherein the first and second addressing signals have different amplitudes and different durations.

10. A method according to claim 9 wherein the second addressing signal has an amplitude not greater than about one-fifth of the amplitude of the first addressing signal and a duration at least about five times the duration of the first addressing signal.

11. A method according to claim 10 wherein the second addressing signal has an amplitude not greater than about one-tenth of the amplitude of the first addressing signal and a duration at least about ten times the duration of the first addressing signal.

12. A method according to claim 1 wherein, in step (a), a plurality of first addressing pulses are applied to the display element.

13. A method according to claim 1 wherein, in step (b), a plurality of second addressing pulses are applied to the display element.

14. A method according to claim 1 wherein a predetermined time is allowed to elapse after step (a) and before step (b).

15. A method of addressing a bistable display, this display comprising a set of display elements each having first and second display states differing in at least one optical property, the method comprising:
    (a) causing the display to display a first image in which a first subset of display elements are in their first display state and the complement of the first subset of display elements are in their second display state;
    (b) applying to the first subset of display elements, but not to the complement of the first subset, a first addressing signal, thereby causing the first subset to assume their second display state; and
    (c) applying to a second subset of display elements, different from said first subset, but not to the complement of the second subset, a second addressing signal, thereby causing the second subset to assume their first display state and the display to display a second image, different from the first image, the second image being formed by the second subset of display elements being in their first display state and the complement of the second subset being in their second display state.

16. A method according to claim 15 wherein the display elements are electrophoretic display elements.

17. A method according to claim 16 wherein the display elements are encapsulated electrophoretic display elements.

18. A method according to claim 16 wherein the display element comprises an electrophoretic medium comprising a liquid and at least one particle disposed within the liquid and capable of moving therethrough on application of an electric field to the medium.

19. A method according to claim 18 wherein the display element has a viewing surface and the liquid has a optical property differing from that of the at least one particle, the display element being in its first display state when the at least one particle lies adjacent its viewing surface and being in its second display state when the at least one particle is spaced from its viewing surface so that the liquid lies adjacent the viewing surface.

20. A method according to claim 18 wherein the display element has a viewing surface and the liquid has disposed therein at least one first particle having a first optical property and a first electrophoretic mobility and at least one second particle having a second optical property different from the first optical property and a second electrophoretic mobility different from the first electrophoretic mobility, the display element being in its first display state when the at least one first particle lies adjacent its viewing surface and being in its second display state when the at least one second particle lies adjacent its viewing surface.

21. A method according to claim 15 further comprising, prior to step (a), causing all the display elements of the set to assume their second display state, and thereafter applying to the first subset of display elements, but not to the complement of the first subset, a third addressing signal, thereby causing the first subset of display elements to assume their first display state.

22. A method according to claim 21 wherein all the display elements of the set are caused to assume their second display state by applying to all the display elements a pre-blanking signal sufficient to cause every display element to assume its first display state, and thereafter applying to all the display elements a blanking signal sufficient to cause every display element to assume its second display state.

23. A method according to claim 22 wherein the algebraic sum of the integral of the pre-blanking signal with respect to time and the integral of the blanking signal with respect to time is substantially zero.

24. A method according to claim 15 wherein the algebraic sum of the integral of the first addressing signal with respect to time and the integral of the second addressing signal with respect to time is substantially zero.

25. A method according to claim 24 wherein the absolute value of the algebraic sum is less than about 10 Volt-seconds.

26. A method according to claim 25 wherein the absolute value of the algebraic sum is less than about 1 Volt-second.

27. A method according to claim 26 wherein the absolute value of the algebraic sum is less than about 0.1 Volt-second.

28. A method according to claim 15 wherein a plurality of first addressing pulses are applied to the first subset of display elements.

29. A method according to claim 15 wherein a plurality of second addressing pulses are applied to the second subset of display elements.

30. A method according to claim 15 wherein said display has on one side thereof a common electrode extending across all the display elements of the set, and on the opposed side thereof a plurality of discrete electrodes, one of the discrete electrodes being associated with each display element of the set, and wherein the first addressing signal is provided by setting the common electrode to a first voltage and the discrete electrodes associated with the first subset of display elements to a second voltage different from the first voltage, while the second addressing signal is provided by setting the common electrode to the second voltage and the discrete electrodes associated with the second subset of display elements to the first voltage.

31. A method according to claim, 30 further comprising, prior to step (a), causing all the display elements of the set to assume their second display state, and thereafter applying to the first subset of display elements, but not to the complement of the first subset, a third addressing signal, thereby causing the first subset of display elements to assume their first display state.

32. A method according to claim 31 wherein all the display elements of the set are caused to assume their second display state by applying to all the display elements a pre-blanking signal sufficient to cause every display element to assume its first display state, and thereafter applying to all the display elements a blanking signal sufficient to cause every display element to assume its second display state.

33. A method according to claim 32 wherein the pre-blanking signal is provided by setting the common electrode to the second voltage and all the discrete electrodes to the first voltage, while the blanking signal is provided by setting the common electrode to the first voltage and all the discrete electrodes to the second voltage.

34. A method of addressing a bistable display, this display comprising a set of display elements each having first and second display states differing in at least one optical property, the method comprising:

(a) selecting a first subset of display elements that represent a first image, and applying to the first subset a first addressing signal, thereby causing the first subset to assume their first display state and the display to display the first image;

(b) selecting a second subset of display elements that represent a second image different from the first image and thereby defining four classes of display elements, namely a first class which are members of both the first and second subsets, a second class which are members of the first subset but not members of the second subset, a third class which are not members of the first subset but are members of the second subset, and a fourth class which are not members of either the first or the second subset, and applying to the second class a second addressing signal, thereby setting the second class to their second display state, and applying to the third class a third addressing signal, thereby setting the third class to their first display state, and causing the display to display the second image, and wherein the display has on one side thereof a common electrode extending across all the display elements of the set, and on the opposed side thereof a plurality of discrete electrodes, one of the discrete electrodes being associated with each display element of the set, the common electrode being kept at a substantially constant first voltage during steps (a) and (b).

35. A method according to claim 34 wherein the discrete electrodes associated with at least one of the first and fourth classes of display elements are kept at substantially the constant first voltage during steps (a) and (b).

36. A method according to claim 35 wherein the discrete electrodes associated with both the first and fourth classes of display elements are kept at substantially the constant first voltage during steps (a) an (b).

37. A method according to claim 35 wherein the second addressing signal is provided by setting the discrete electrodes associated with the second class of display elements to a second voltage substantially equal to the first voltage plus a predetermined difference, and the third addressing signal is provided by setting the discrete electrodes associated with the third class of display elements to a third voltage substantially equal to the first voltage minus the predetermined difference.

38. A method according to claim 37 wherein the second and third addressing signals are each preceded by a pre-addressing signal, this pre-addressing signal being provided by setting the discrete electrodes associated with the second class of display elements to substantially the third voltage and the discrete electrodes associated with the third class of display elements to substantially the second voltage.

39. A method of addressing a bistable display comprising a set of display elements each having first and second display states differing in at least one optical property, the display having on one side thereof a common electrode extending across all the display elements of the set, and on the opposed side thereof a plurality of discrete electrodes, one of the discrete electrodes being associated with each display element of the set, the method comprising:

(a) selecting a first subset of display elements that represent a first image;

(b) selecting a second subset of display elements that represent a second image different from the first image and thereby defining four classes of display elements, namely a first class which are members of both the first and second subsets, a second class which are members of the first subset but not members of the second subset, a third class which are not members of the first subset but are members of the second subset, and a fourth class which are not members of either the first or the second subset, (c) bringing the display to a state in which the first and classes of display elements are in their first display state and the third and fourth classes are in their second display state, thereby causing the first image to be displayed; and (d) applying a first voltage to the common electrode for a first period and a different second voltage to the common electrode for a second period, while maintaining the discrete electrodes associated with at least one of the first and fourth classes of display elements at substantially the same voltages as the common electrode, and maintaining the discrete electrodes associated with one of the second and third classes of display elements substantially at the first voltage while maintaining the discrete electrodes associated with the other of the second and third classes substantially at the second voltage, thereby causing the first and third classes of display elements to be in their first display state and the second and fourth classes of display elements to be in their second display state, so that the display displays the second image.

40. A method according to claim 39 wherein, in step (d) the discrete electrodes associated with both the first and fourth classes of display elements are maintained at substantially the same voltage as the common electrode.

41. A method according to claim 39 wherein the first and second periods are substantially equal in duration.

42. A method according to claim 39 wherein the common electrode is subjected to a plurality of cycles each comprising a first period in which the first voltage is applied and a second period in which the second voltage is applied, and wherein the discrete electrodes associated with one of the second and third classes of display elements are maintained substantially at the first voltage and the discrete electrodes associated with the other of the second and third classes are maintained substantially at the second voltage throughout the plurality of cycles.

43. A bistable display element having first and second display states differing in at least one optical property; and a signal control module arranged to apply at least first and second addressing signals to the display element, the first addressing signal changing the display state of the element and the second addressing signal not substantially changing the display state of the element, the algebraic sum of the integral of the first addressing signal with respect to time and the integral of the second addressing signal with respect to time having an absolute value less than about 1 Volt-second.

* * * * *

UNITED STATES PATENT AND TRADEMARK OFFICE
CERTIFICATE OF CORRECTION

PATENT NO. : 6,531,997 B1
DATED : March 11, 2003
INVENTOR(S) : Gates et al.

It is certified that error appears in the above-identified patent and that said Letters Patent is hereby corrected as shown below:

Column 6,
Line 61, between "and" and "classes" insert -- second --.

Column 37,
Line 20, at beginning of line insert -- second --.

Signed and Sealed this

Twenty-first Day of February, 2006

JON W. DUDAS
*Director of the United States Patent and Trademark Office*